(12) United States Patent
Spurgeon et al.

(10) Patent No.: US 11,762,393 B2
(45) Date of Patent: *Sep. 19, 2023

(54) SHIPPING SYSTEM AND CONTROL SYSTEM FOR SECURE PACKAGE DELIVERY

(71) Applicant: DVW Holdings, LLC, Lenexa, KS (US)

(72) Inventors: Daniel A. Spurgeon, Raytown, MO (US); Vernon Hugh McGee, II, Clay Center, KS (US)

(73) Assignee: DVW Holdings, LLC, Lenexa, KS (US)

( * ) Notice: Subject to any disclaimer, the term of this patent is extended or adjusted under 35 U.S.C. 154(b) by 10 days.

This patent is subject to a terminal disclaimer.

(21) Appl. No.: 17/665,216

(22) Filed: Feb. 4, 2022

(65) Prior Publication Data
US 2022/0221875 A1 Jul. 14, 2022

Related U.S. Application Data

(63) Continuation-in-part of application No. 16/944,357, filed on Jul. 31, 2020, now Pat. No. 11,654,563.
(Continued)

(51) Int. Cl.
*B65G 1/137* (2006.01)
*G05D 1/02* (2020.01)
(Continued)

(52) U.S. Cl.
CPC ......... *G05D 1/0225* (2013.01); *B65G 1/1373* (2013.01); *G05D 1/0088* (2013.01); *G06Q 10/083* (2013.01)

(58) Field of Classification Search
CPC .............. G05D 1/0225; G05D 1/0088; G05D 2201/0216; G05D 1/021; B65G 1/1373;
(Continued)

(56) References Cited

U.S. PATENT DOCUMENTS 8,989,053 B1 * 3/2015 Skaaksrud ......... G06Q 30/0267
370/255
9,315,344 B1 * 4/2016 Lehmann ............. B65B 59/001
(Continued)

*Primary Examiner* — B M M Hannan
(74) *Attorney, Agent, or Firm* — HOVEY WILLIAMS LLP; Randall W. Schwartz

(57) ABSTRACT

A shipping system is configured to facilitate transfer of a package into and/or out of a room in a building. The shipping system is for controlling a shiftable panel of the building to selectively provide a path into and out of the room. The shipping system includes a control system. The control system broadly includes a vehicle sensor and a system processor. The system processor is configured to receive package identification data associated with the package, have the panel opened to allow room ingress and egress along the path based on the package identification data, move an autonomous vehicle to a location adjacent the panel to facilitate package transfer, based on vehicle location data, and have the panel closed to restrict room ingress and egress along the path in response to a determination that the package has been transferred into or out of the room via the path.

22 Claims, 26 Drawing Sheets

Related U.S. Application Data

(60) Provisional application No. 62/881,669, filed on Aug. 1, 2019.

(51) Int. Cl.
 *G06Q 10/083* (2023.01)
 *G05D 1/00* (2006.01)

(58) Field of Classification Search
 CPC .............. B65G 67/02; G06Q 10/083; E06B 2003/7057
 USPC ............................................. 700/245
 See application file for complete search history.

(56) References Cited

U.S. PATENT DOCUMENTS

| | | | | |
|---|---|---|---|---|
| 10,241,516 B1* | 3/2019 | Brady | ................ | G05D 1/0027 |
| 10,303,171 B1* | 5/2019 | Brady | ................ | G05D 1/0278 |
| 10,929,804 B2* | 2/2021 | Ladden | .............. | G06Q 10/0833 |
| 11,222,299 B1* | 1/2022 | Baalke | ................ | G06Q 10/087 |
| 2015/0235165 A1* | 8/2015 | Miette | ...................... | B07C 3/02 |
| | | | | 705/337 |
| 2015/0379468 A1* | 12/2015 | Harvey | ........... | G06Q 10/08355 |
| | | | | 705/338 |
| 2016/0090248 A1* | 3/2016 | Worsley | ................ | B65G 61/00 |
| | | | | 414/398 |
| 2017/0107056 A1* | 4/2017 | Kadaba | ................ | B60P 1/52 |
| 2017/0323545 A1* | 11/2017 | Gillen | ................ | G06Q 10/083 |
| 2018/0096270 A1* | 4/2018 | High | ................ | G07C 9/00896 |
| 2018/0194575 A1* | 7/2018 | Anderson | ............. | G06Q 10/08 |
| 2018/0247474 A1* | 8/2018 | Matsuyama | ....... | G07C 9/00896 |
| 2018/0299882 A1* | 10/2018 | Kichkaylo | ........... | G05B 19/418 |
| 2018/0306591 A1* | 10/2018 | Jose | .................... | G01C 21/3848 |
| 2018/0307241 A1* | 10/2018 | Holz | .................... | G05D 1/0274 |
| 2019/0196480 A1* | 6/2019 | Taylor | ................... | G05D 1/0223 |
| 2020/0017297 A1* | 1/2020 | Mohan | ................... | G06Q 50/28 |

* cited by examiner

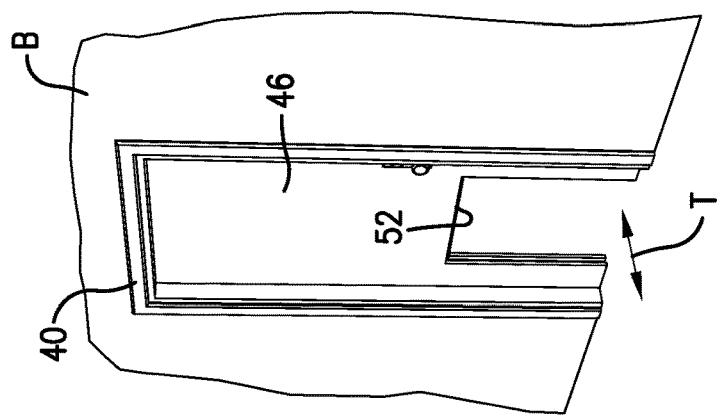
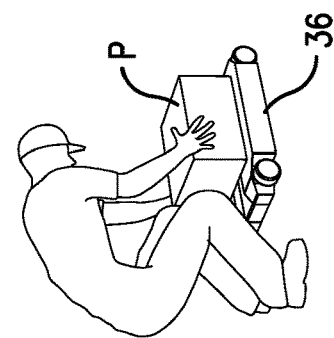
Fig. 8.
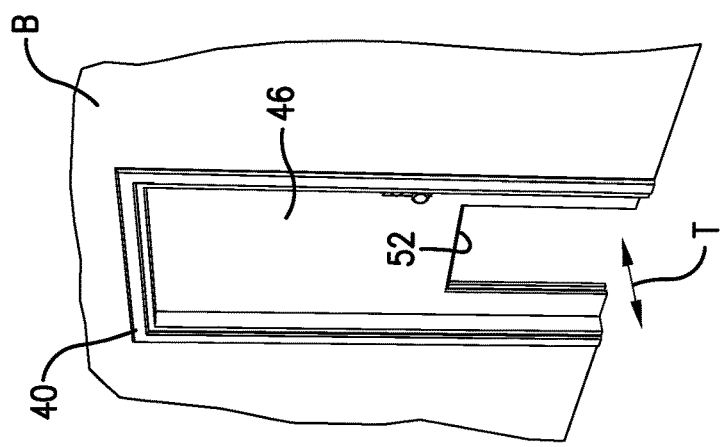
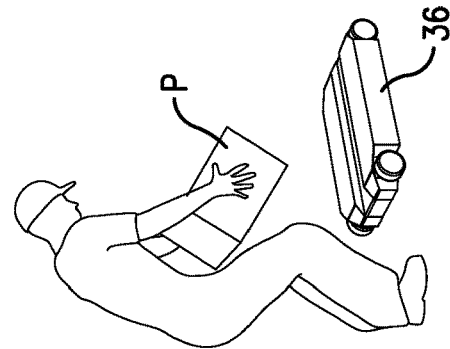
Fig. 7.

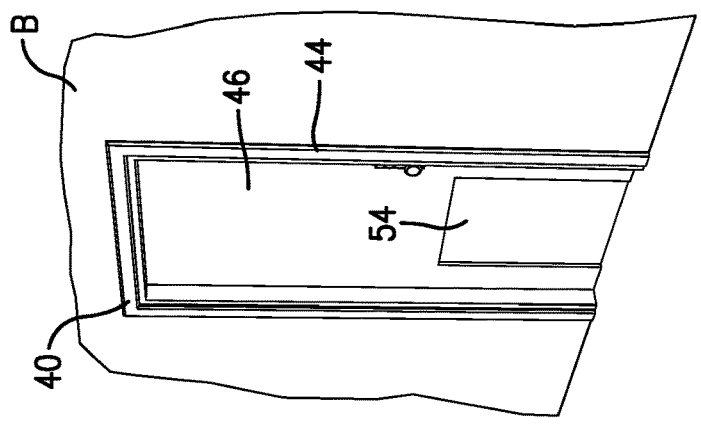
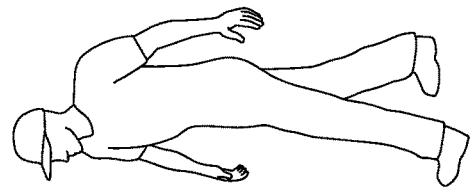
Fig. 10.
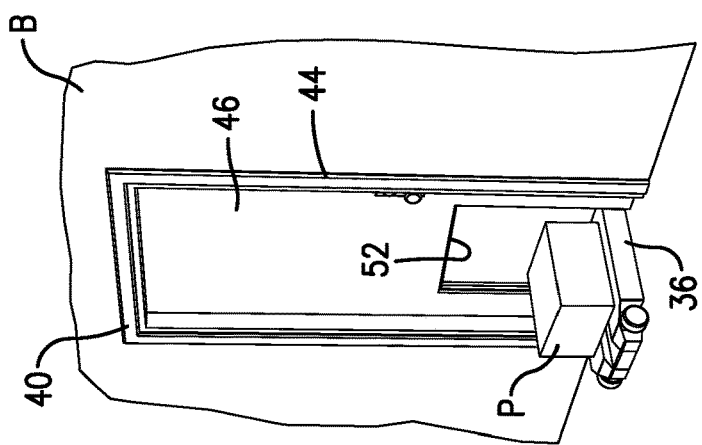
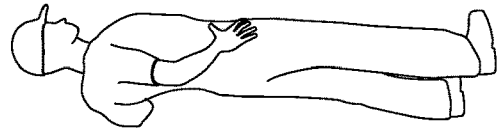
Fig. 9.

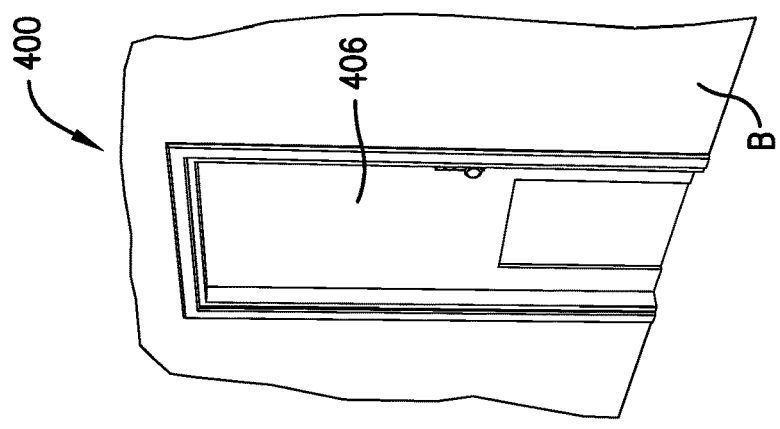
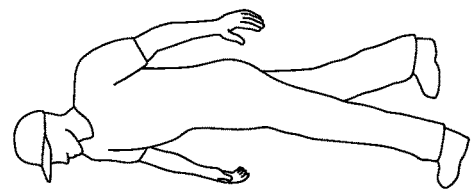
Fig. 21.
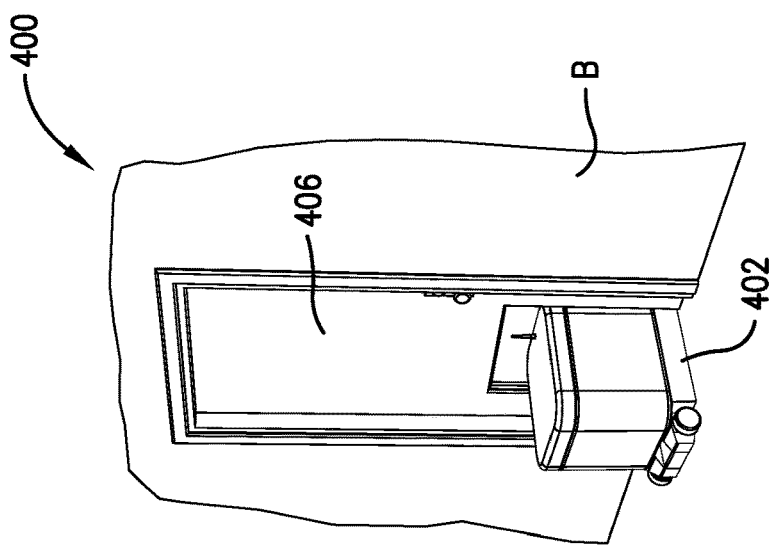
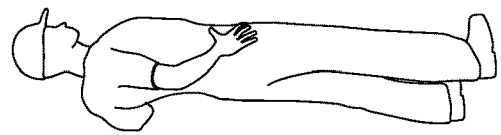
Fig. 20.

SHIPPING SYSTEM AND CONTROL SYSTEM FOR SECURE PACKAGE DELIVERY

CROSS-REFERENCE TO RELATED APPLICATIONS

This is a continuation-in-part of U.S. Nonprovisional application Ser. No. 16/944,357, filed Jul. 31, 2020, entitled SHIPPING SYSTEM AND CONTROL SYSTEM FOR SECURE PACKAGE DELIVERY, which application claims the benefit of U.S. Provisional Application Ser. No. 62/881,669, filed Aug. 1, 2019, entitled ELECTRONIC DEVICE FOR SECURE PACKAGE DELIVERY, each of which is hereby incorporated in its entirety by reference herein.

BACKGROUND

1. Field

The present invention relates generally to shipping systems. More specifically, embodiments of the present invention concern a shipping system and a control system operable to provide secure package delivery.

2. Discussion of Prior Art

Prior art shipping methods include secure and unsecure methods for transferring a delivery item from a sender or transferring a delivery item to a recipient. Conventional post office practices utilize secure mailbox equipment to securely hold a sender's delivery item prior to shipment. Similarly, conventional secure mailbox equipment is generally provided by the post office or shipping service and may be used to securely hold a recipient's delivery item when it is received. It is known for secure mailboxes to be utilized at a post office, at places of business, or at other locations near a residential location or place of business.

With the proliferation of online retailers, drop-shipping services, and home delivery services, conventional mailbox equipment and shipping practices have several notable deficiencies. For instance, prior art home deliveries and services are known to leave delivered items unsecured at a location. For unsecured delivery items, instances of theft and tampering are pervasive and well-known. Furthermore, it is also common for delivery items to be sent to the wrong address by home delivery services.

This background discussion is intended to provide information related to the present invention which is not necessarily prior art.

SUMMARY

The following brief summary is provided to indicate the nature of the subject matter disclosed herein. While certain aspects of the present invention are described below, the summary is not intended to limit the scope of the present invention.

Embodiments of the present invention provide a shipping system that does not suffer from the problems and limitations of prior art devices, including those devices set forth above.

A first aspect of the present invention concerns a shipping system configured to facilitate transfer of a package into and/or out of a room in a building. The shipping system is for controlling a shiftable panel of the building to selectively provide a path into and out of the room. The shipping system broadly includes an autonomous vehicle and a control system. The autonomous vehicle is configured to be advanced along the path to facilitate package transfer. The control system is configured to permit movement of the package into and/or out of the room. The control system is configured to control the shiftable panel to selectively provide the path into and out of the room. The control system broadly includes a vehicle sensor and a system processor. The vehicle sensor is configured to sense vehicle location data associated with the location of the autonomous vehicle relative to the panel. The system processor is configured to receive package identification data associated with the package, have the panel opened to allow room ingress and egress along the path based on the package identification data, move the autonomous vehicle to a location adjacent the panel to facilitate package transfer, based on the vehicle location data, and have the panel closed to restrict room ingress and egress along the path in response to a determination that the package has been transferred into or out of the room via the path.

A second aspect of the present invention concerns a shipping system configured to facilitate transfer of a package into and/or out of a room in a building. The shipping system is operable to selectively provide a path into and out of the room for package transfer and an autonomous vehicle configured to be advanced along the path to facilitate package transfer. The shipping system broadly includes a shiftable panel assembly and a control system. The shiftable panel assembly is operable to be constructed as part of the building and includes a shiftable panel that is shiftable between open and closed positions to selectively provide access to the room. The control system is configured to permit movement of the package into and/or out of the room. The control system is configured to control the shiftable panel to selectively provide the path into and out of the room. The control system broadly includes a location sensor and a system processor. The location sensor is configured to sense package location data associated with the location of the package relative to the panel. The system processor is configured to receive package identification data associated with the package, have the panel opened to allow room ingress and egress along the path based on the package identification data, move the autonomous vehicle to a location adjacent the panel to facilitate package transfer, based on the vehicle location data, and have the panel closed to restrict room ingress and egress along the path in response to a determination that the package has been transferred into or out of the room via the path.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein:

FIGS. 5-10 are schematic views of the shipping system shown in FIGS. 1-4, showing steps of a package transfer process where a package is delivered to a building occupant;

FIGS. 16-21 are schematic views of a shipping system constructed in accordance with a third embodiment of the present invention, showing steps of a package transfer process where a package is delivered to a building occupant;

Figure 1:
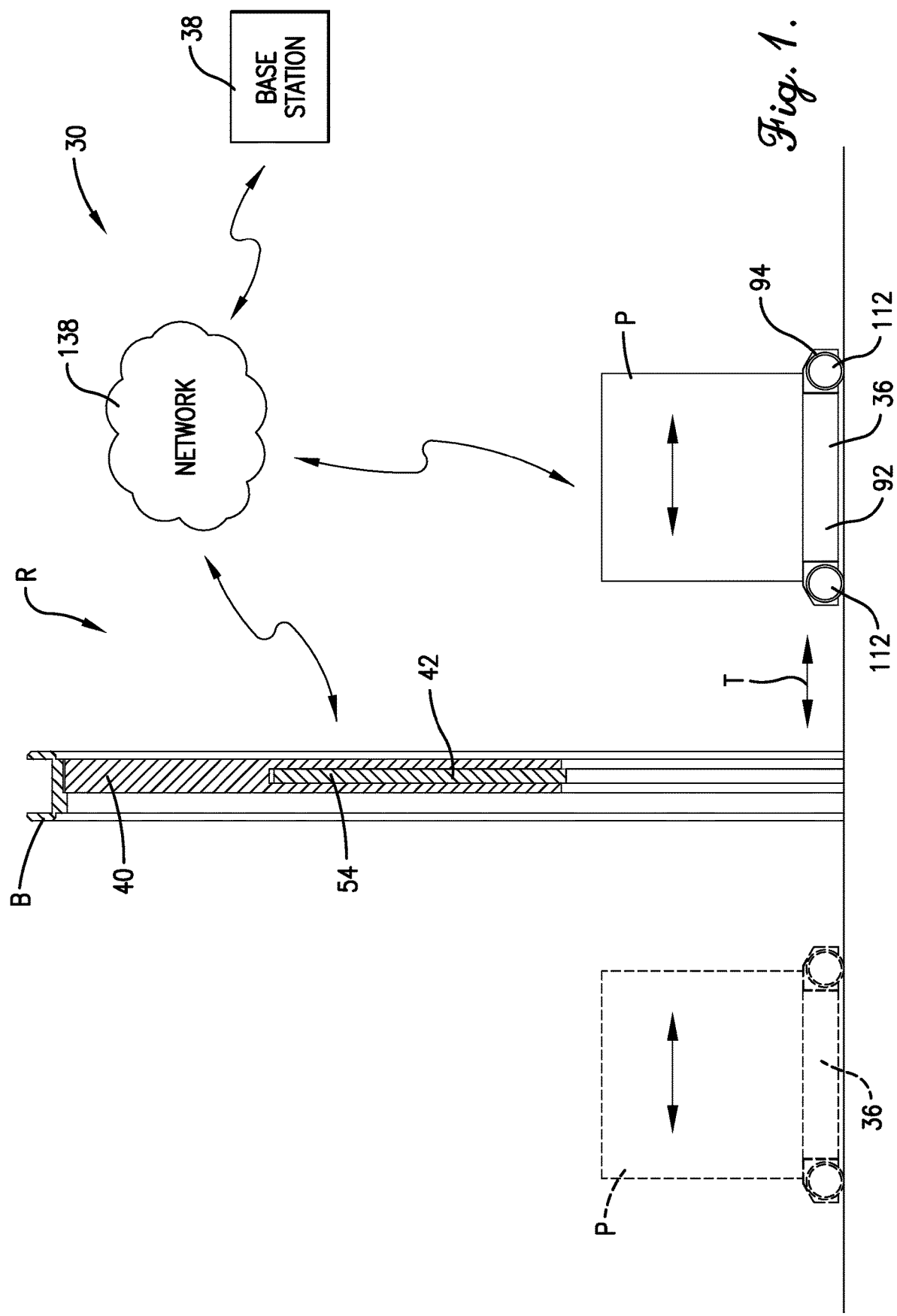
FIG. 1 is an elevational view of a shipping system constructed in accordance with a first preferred embodiment of the present invention, showing an autonomous vehicle, door, base station, and network of the shipping system provided as part of a building, with the vehicle being located in a room of the building.

The drawing figures do not limit the present invention to the specific embodiments disclosed and described herein. While the drawings do not necessarily provide exact dimensions or tolerances for the illustrated components or structures, the drawings, not including any purely schematic drawings, are to scale with respect to the relationships between the components of the structures illustrated therein.

DETAILED DESCRIPTION OF THE PREFERRED EMBODIMENTS

Figure 2:
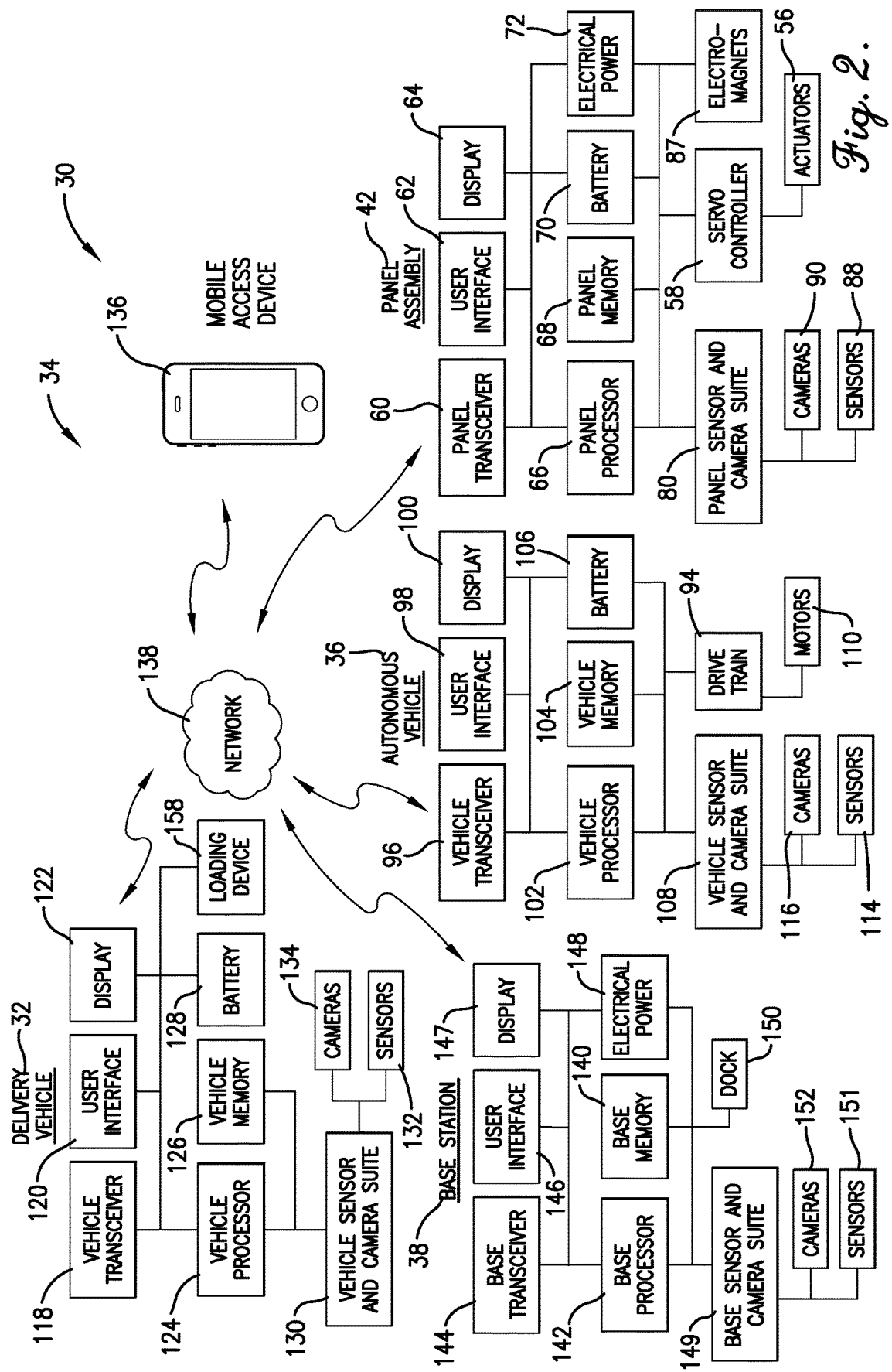
FIG. 2 is a schematic view of the shipping system shown in FIG. 1.

Turning initially to FIGS. 1 and 2, a shipping system 30 is constructed in accordance with a preferred embodiment of the present invention and is configured to facilitate transfer of a package P between a room R in a building B and a delivery vehicle 32 outside the room R associated with a shipment order. As will be described, the shipping system 30 includes a control system 34 for controlling a shiftable panel of the building B to selectively provide a path T (see FIGS. 6-8) into and out of the room R and an autonomous vehicle 36 configured to be advanced along the path to receive the package P. The shipping system 30 includes the autonomous vehicle 36, a base station 38, and a door 40.

The package P may have a package container to hold one or more delivery items. The package container may take various forms, such as an envelope, box, sack, can, tube, etc. Suitable packaging materials may include paper, cardboard, wood, synthetic resin material, and/or a metal material. The package P may include a plurality of items that are packaged together or separately packaged from one another.

The package identification data may be associated with the package P and provided in various forms, such as printed indicia (e.g., a barcode) and/or an RFID chip.

The depicted building B is preferably in the form of a single-family residential home. However, the principles of the present invention are equally applicable for use with other types of buildings, such as a multi-family residential complex or a commercial building having one or more commercial occupants. As will be shown in a subsequent embodiment, the building B may include a multi-occupant facility.

Shipping System

Turning to FIGS. 1-12, the door 40 preferably includes a powered panel assembly 42 to selectively provide a path T into and out of the room R for room ingress and egress. As described below, the panel assembly 42 facilitates transfer of the package P between the room R and the delivery vehicle 32 outside the room R associated with a shipment order.

Figure 3:
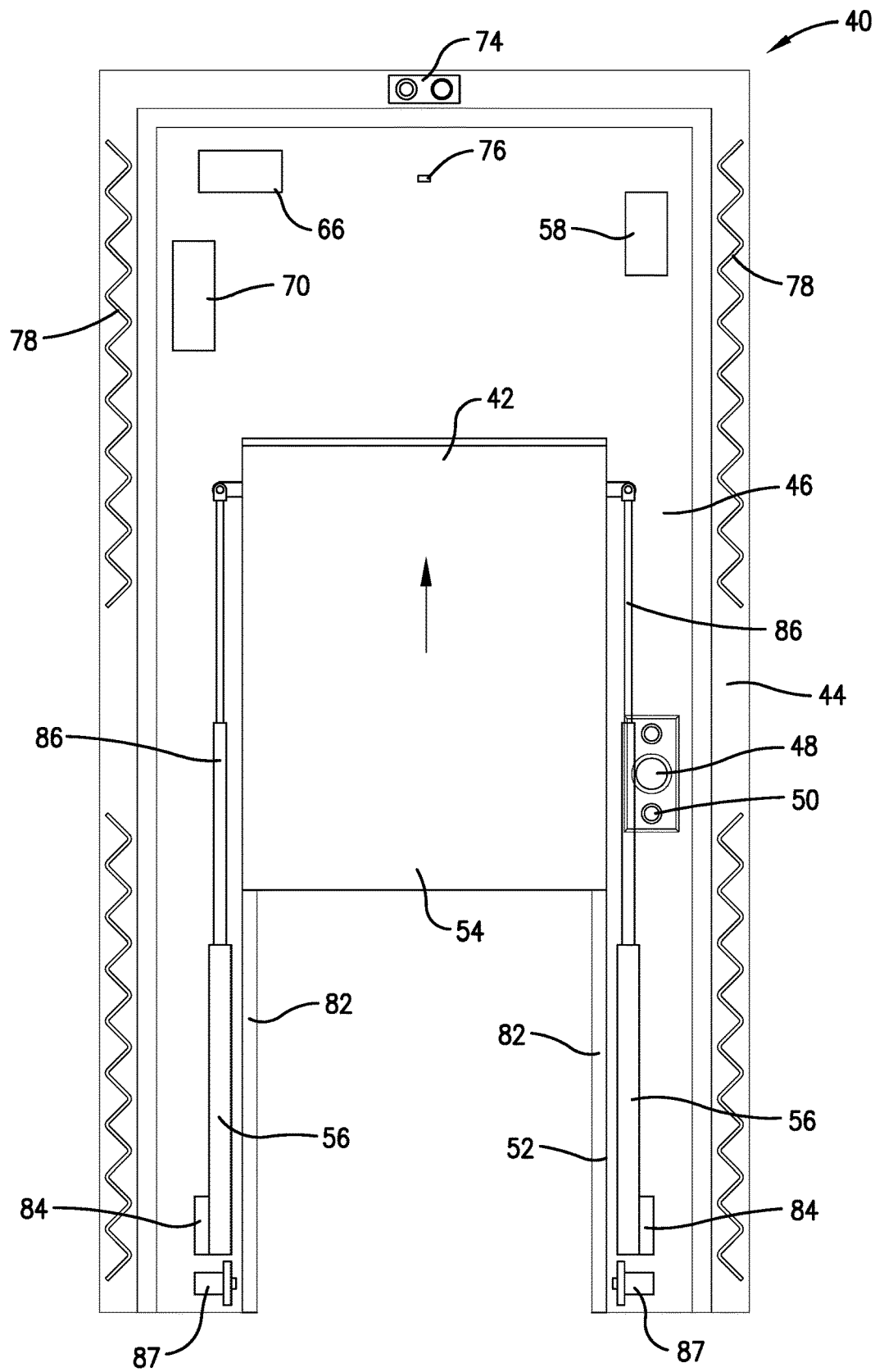
FIG. 3 is a front elevation of the door shown in FIG. 1, showing a panel assembly of the door in an open position to permit room ingress and egress.
Figure 4:
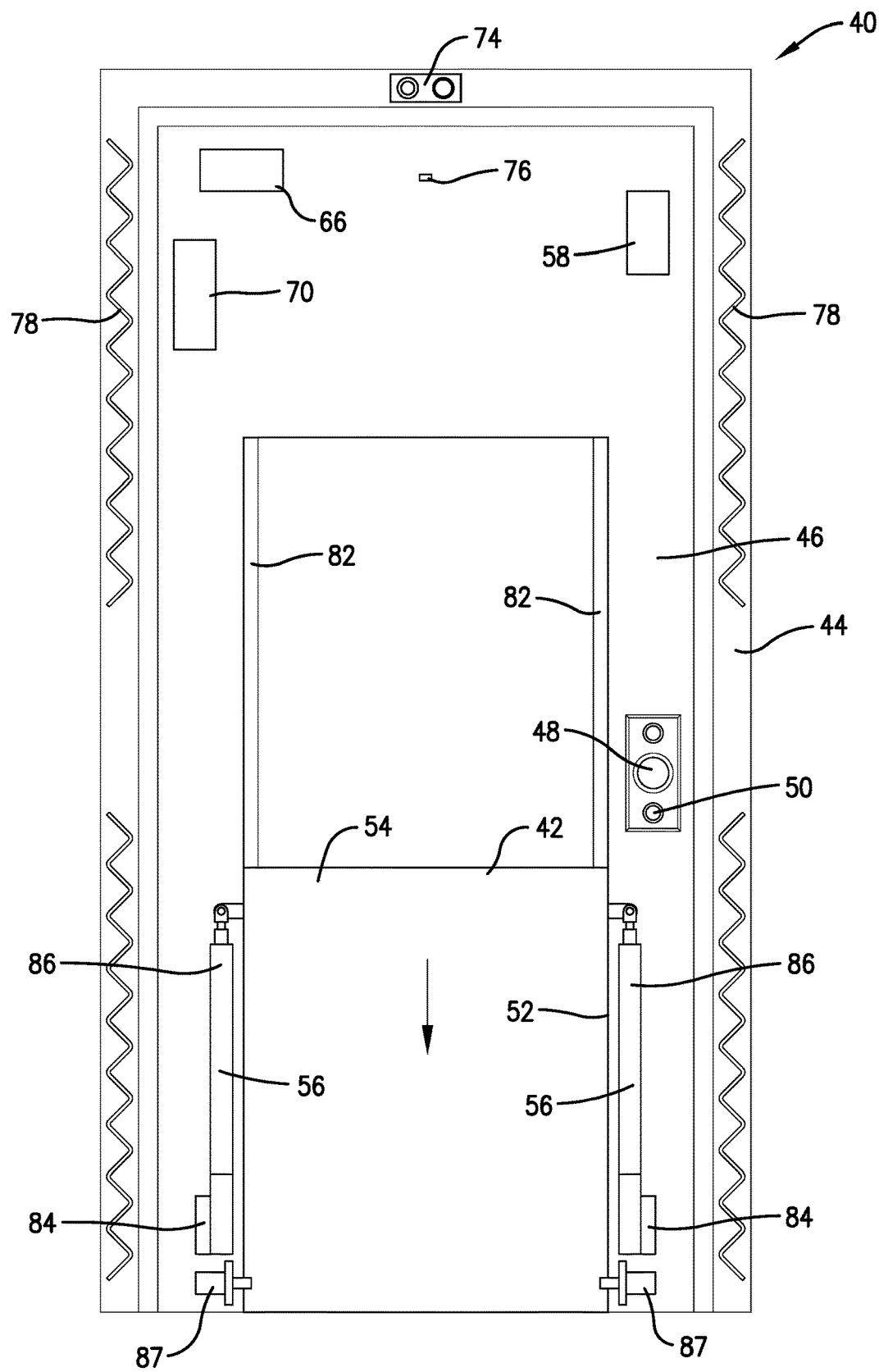
FIG. 4 is a front elevation of the door similar to FIG. 3, but showing the panel assembly of the door in a closed position to restrict room ingress and egress.

The door 40 broadly includes a door frame 44, a swingable door 46, and the panel assembly 42 (see FIGS. 3 and 4). In the usual manner, the swingable door 46 is swingably mounted to the door frame 44 and includes a door handle 48. The door handle 48 preferably includes a door lock 50, which may comprise a manual door lock or an electronic smart lock. In the usual manner, the swingable door 46 is configured to be opened and closed for room ingress and egress by a person. The swingable door 46 preferably presents a panel opening 52 to operably receive a shiftable panel 54 of the panel assembly 42.

The illustrated panel assembly 42 includes the shiftable panel 54, panel actuators 56, a servo controller 58, panel transceiver 60, user interface 62, display 64, processor 66, memory 68, battery 70, line power source 72, audio speaker and microphone assembly 74, communication port 76, antenna 78, and a sensor and camera suite 80 (see FIGS. 2-4).

The panel 54 is shiftably supported by guide rails 82 of the swingable door 46 and is shiftable between an open position, where the panel 54 is located above the panel opening 52, and a closed position, where the panel 54 spans the door opening 52.

The panel actuators 56 each preferably include a linear motor with an electric motor 84 and an extendable shaft 86 that is shiftable along a vertical direction to raise and lower the panel 54 between the open and closed positions. It is within the ambit of the present invention for the panel assembly to have an alternative actuator, such as an alternative linear motor (e.g., a hydraulic or pneumatic linear motor), or a drive motor other than a linear motor (e.g., an electric, hydraulic, or pneumatic motor with a rotating shaft). The panel actuators are configured to be operated by the servo controller 58, which may be operably connected to the actuators 56 via a wired or wireless connection. The panel assembly 42 also preferably includes electromagnets 87 that are configured to removably secure the panel 54 in the closed position.

The battery 70 is configured to supply power to other components of the door 40. The battery 70 preferably comprises a conventional rechargeable battery (such as a lithium ion battery) and may be integrated into the swingable door construction.

The audio speaker and microphone assembly 74 is configured to permit two-way communication between a room occupant and a delivery person outside the building B. The communication port 76, which may include a USB port, is configured to be removably operably connected with an electronic device (such as a portable computer, tablet, smart phone, etc.) outside the room R via a cable or other line (not shown). The communication port 76 is configured to provide data transfer between the system 30 and the electronic device.

The depicted sensor and camera suite 80 is operable to monitor various aspects of the system 30 and delivery service, particularly during the process of conducting a package transfer. The suite 80 includes sensors 88 and cameras 90. For instance, as will be described, one or more of the sensors 88 (such as a barcode scanner and/or an RFID scanner) and/or cameras 90 may be used to identify the package P and/or determine the location of the package P.

As used herein, the term "sensor" may include one or more of various types of sensors or cameras for sensing, collecting, and/or generating corresponding sensor data.

Although the panel assembly 42 is preferably integrated as part of the door, the panel assembly could be alternatively provided as part of the building B. For instance, the panel assembly may be integrated into an alternative exterior door. The panel assembly may also be integrated into an exterior wall of the building B.

The autonomous vehicle 36 is configured to receive and move the package P during the package transfer process (see FIGS. 5-10 and 12). The autonomous vehicle 36 preferably includes a chassis 92, a drive train 94, a transceiver 96, user interface 98, display 100, processor 102, memory 104, battery 106, and a sensor and camera suite 108 (see FIGS. 1 and 2).

The drive train 94 is operably supported by the chassis 92 and includes electric motors 110 to drive wheels 112.

The depicted sensor and camera suite 108 is operable to monitor various aspects of the system 30 and delivery service, particularly during the process of conducting a package transfer. The suite 108 includes sensors 114 and cameras 116. For instance, one or more sensors 114 (such as a barcode scanner and/or an RFID scanner) and/or cameras 116 may be used to identify the package P and/or determine the location of the package P.

The delivery vehicle 32 is configured to transfer the package P with a building occupant (by delivering the package to the occupant or receiving the package from the occupant). The delivery vehicle 32 preferably includes a commercial truck or van (not shown) configured to haul multiple packages. However, an alternative delivery vehicle may include an alternative wheeled vehicle (e.g., an automobile, motorcycle, scooter, moped, etc.) or a flying vehicle (e.g. a helicopter, drone, etc.) configured to transport one or more packages.

The delivery vehicle 32 preferably includes a chassis (not shown), drive train (not shown), transceiver 118, user interface 120, display 122, processor 124, memory 126, battery 128, and a sensor and camera suite 130 (see FIG. 2).

The depicted sensor and camera suite 130 is operable to monitor various aspects of the system 30 and delivery service, particularly during the process of conducting a package transfer. The suite 108 includes sensors 132 and cameras 134 (see FIG. 2). For instance, one or more sensors 132 (such as a barcode scanner and/or an RFID scanner) and/or cameras 134 may be used to identify the package P and/or determine the location of the package P.

As used herein, one or more system processors may include one or more processing units (e.g., in a multi-core configuration) for executing instructions. The instructions may be executed within a variety of different operating systems, such as UNIX, LINUX, Microsoft Windows®, etc. More specifically, the instructions may cause various data manipulations on data stored in a storage device. It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.).

One or more system processors may be operatively coupled to a communication interface such that the corresponding base station, delivery vehicle, autonomous vehicle, panel assembly, etc. can communicate with one or more remote devices. For example, a communication interface associated with the base station may receive wireless or wired communications from the delivery vehicle, autonomous vehicle, panel assembly, or another remote device.

As described herein, a memory may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

It will be understood that one or more processors of the system may be operatively coupled to a storage device (not shown). The storage device is any computer-operated hardware suitable for storing and/or retrieving data. In some embodiments, the storage device may be integrated in the base station. In other embodiments, the storage device may be external to the base station, such as the third party data repository or database. For example, the base station may include one or more hard disk drives as the storage device. In other embodiments, the storage device may be external to the base station and may be accessed by a plurality of base stations. For example, the storage device may include multiple storage units such as hard disks or solid-state disks in a redundant array of inexpensive disks (RAID) configuration. The storage device may include a storage area network (SAN) and/or a network attached storage (NAS) system.

In some embodiments, one or more system processors may be operatively coupled to the storage device via a storage interface. The storage interface is any component capable of providing the processor with access to the storage device. The storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 56 with access to the storage device.

Control System and Control Method

Referring to FIGS. 2 and 5-12, embodiments of a control system and a computer-implemented control method are shown for facilitating transfer of a package between a room in a building and a delivery vehicle outside the room associated with a shipment order.

The control system and computer-controlled control method may involve some or all of the elements and features described above or may involve substantially any suitable additional or alternative conventional or non-conventional technologies for accomplishing the processes described below. Further, while described in an example agricultural operating context, the control system and computer-implemented control method are not limited thereto and may be adapted for use in substantially any other suitable operating context.

An embodiment of the control system 34 is shown for facilitating the transfer of a package between a delivery service and a secure room. Broadly, the control system 34 may be configured to communicate with and/or control the delivery vehicle 32 in connection with a package transfer relative to the room R. In various embodiments, the autonomous vehicle 36 may autonomously receive and transfer the package P between the room R and the delivery vehicle 32, while maintaining periodic or continuous communication with the base station 38 and a mobile access device 136 via a wireless communications network 138.

Referring to FIG. 2, an embodiment of the base station 38 may include a base memory 140, a base processor 142, a base transceiver 144, an input interface 146, display 147, line power source 148, and base camera and sensor suite 149. The base station 38 may also include a vehicle dock 150 configured to have the autonomous vehicle 36 removably docked therewith. The base memory 140 may store a management computer program for initiating, monitoring, or otherwise managing operation of the delivery vehicle 32, door 40, and/or autonomous vehicle 36. The base memory 140 may also store operation instructions for a particular job, wherein the operation instructions may guide one or more operations of the delivery vehicle 32, door 40, and/or autonomous vehicle 36 during the particular job. The base processor 142 may execute the management computer program, including communicating the operation instructions to the delivery vehicle 32, door 40, and/or autonomous vehicle 36 via the base transceiver 144, and receiving sensor and/or camera data from the delivery vehicle 32, door 40, and/or autonomous vehicle 36 via the base transceiver 144.

The depicted sensor and camera suite 149 is operable to monitor various aspects of the system 30 and delivery service, particularly during the process of conducting a package transfer. The suite 149 includes sensors 151 and cameras 152 (see FIG. 2). For instance, one or more sensors 151 (such as a barcode scanner and/or an RFID scanner) and/or cameras 152 may be used to identify the package P and/or determine the location of the package P.

In at least one implementation, some or all operations of the delivery vehicle 32, door 40, and/or autonomous vehicle 36 may be controlled by the management computer program executed by the base processor 142, with control signals being transmitted from the base station 38 and sensor and/or camera data being received by the base station 38 via the communications network 138.

In another implementation, some or all operations of the delivery vehicle 32, door 40, and/or autonomous vehicle 36 may be controlled by local computer programs executed by the processors of the delivery vehicle 32, door 40, and/or autonomous vehicle 36, based on operation instructions transmitted from the base station 38 and/or mobile access device 136. The local computer programs may be in periodic or continuous communication with the management computer program. The base transceiver 144 may facilitate bi-directional communication between the base station 38 and the delivery vehicle 32, door 40, and/or autonomous vehicle 36 via the communications network 138. The interface 146 may facilitate interaction by a user with the management computer program, including entry of the operation instructions. The interface 146 and/or display 147 may facilitate communication to the user of relevant information, including sensor and/or camera data from the delivery vehicle 32, door 40, and/or autonomous vehicle 36.

The base memory 140 may be an electronic memory storing operation instructions and other relevant information for access and use by the processor 142.

Figure 11:
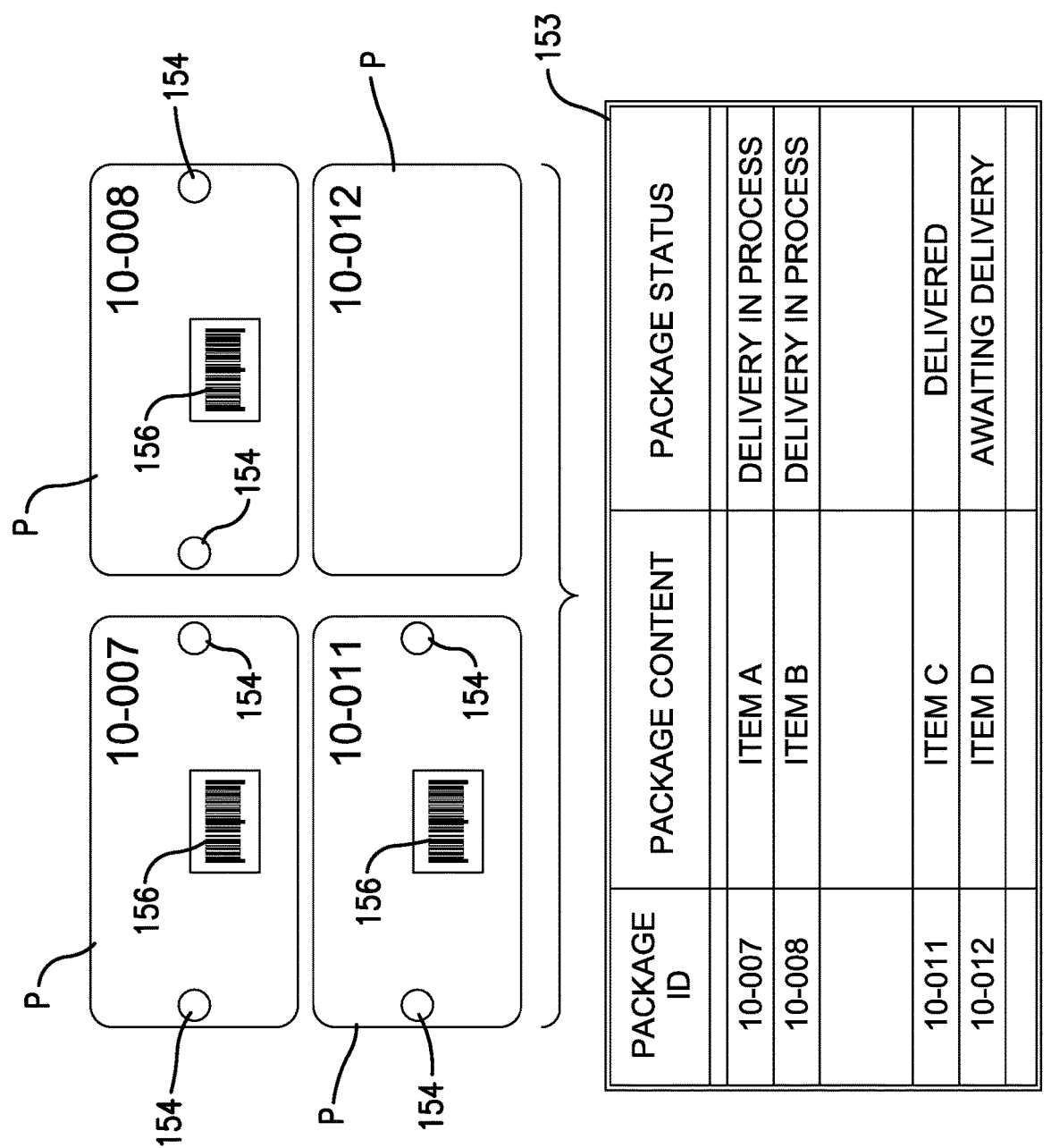
FIG. 11 is a schematic view of several packages for delivery by the shipping system and showing a corresponding data structure associated with the packages.

The base memory 140 may store a look-up table or other data structure 153 for one or more packages, which may include such information as an identifier, a location, a content, and a status for each package (see FIG. 11). Stored data may also include other information, such as item quantity contained in the package and/or a package weight.

The base station 38 preferably comprises a central computer, which may include various equipment, such as a desktop computer, server, portable computer, smartphone, tablet, etc.

The base station 38 may communicate with other system components (e.g., delivery vehicle, autonomous vehicle, panel assembly, etc.) via wired or wireless communication. For example, communication between the components may be established via one or more of a local area network (LAN) or a wide area network (WAN) in typical wired communications. Further, for wireless communications, for example, communication may be established via one or more of Wi-Fi (e.g., implementing the Institute of Electrical and Electronics/IEEE 802.11 family of standards), radio frequency (RF) communication, Bluetooth communication, and/or with a mobile phone network, such as Global System for Mobile communications (GSM), broadband cellular networks (e.g., 3G, 4G, 5G, etc.), or other mobile data networks, and/or Worldwide Interoperability for Microwave Access (WiMax) and the like.

In some embodiments, it is contemplated that the base station may be implemented as a software application. In such embodiments, the hardware described above, such as the processor, the memory, and/or other components may be shared with hardware components of a cloud based system (not shown).

The delivery vehicle 32 preferably provides elements of the control system 34, including the transceiver 118, user interface 120, display 122, processor 124, memory 126, battery 128, and the sensor and camera suite 130.

In at least one implementation, the delivery vehicle 32 may be a partially or fully autonomous vehicle, while in other implementations, the delivery vehicle may be a conventional manually driven vehicle or remotely driven vehicle.

The vehicle memory 126 may be an electronic memory storing operation instructions and other relevant information for access and use by the vehicle processor 124. The vehicle processor 124 may be an electronic processor executing one or more computer programs to control operation of the delivery vehicle 32, including autonomous travel to and from jobsites, aligning with the autonomous vehicle 36, and/or coupling and uncoupling with the autonomous vehicle 36. The vehicle transceiver 118 may facilitate bi-directional communication between the delivery vehicle 32 and the base station 38, panel assembly 42, and/or autonomous vehicle 36 via the communications network 138, including receiving operation instructions for the delivery vehicle 32.

The vehicle sensor and camera suite 130 may include one or more electronic sensors and/or cameras monitoring internal and/or external operations of the delivery vehicle 32 and facilitating accomplishment of the functions of the delivery vehicle 32. For instance, the delivery vehicle 32 may have any internal and/or external sensors 132 and/or cameras 134 desired or needed to accomplish autonomous travel to shipment delivery and/or shipment pickup locations. The delivery vehicle 32 may include one or more cameras providing images of the delivery vehicle 32, the door 40, and/or the autonomous vehicle 36, and/or an area around the delivery vehicle 32 during operation.

The delivery vehicle 32 may have one or more external sensors and/or cameras to facilitate relative positioning with the autonomous vehicle 36, such as position sensors to sense the position of the delivery vehicle 32. In one implementation, the delivery vehicle 32 may present one or more alignment markers (not shown) which the autonomous vehicle 36 senses and/or images for aligning itself with the delivery vehicle 32. The alignment markers may be passive, in that they reflect, e.g., light (e.g., visual, infrared, laser), wherein the light may be emitted by emitters on the autonomous vehicle 36, or the alignment markers may be active in that they emit, e.g., light.

The delivery vehicle 32 may have a delivery vehicle sensor configured to sense delivery vehicle location data associated with the location of the delivery vehicle 32 relative to the panel 54. For example, the delivery vehicle 32 may include a navigation sensor configured to sense and generate navigation data regarding a geographic location and/or a navigation camera to collect or generate the vehicle location data.

The processor 124 of the delivery vehicle 32 and/or another processor of the system 30 may be configured to have the delivery vehicle 32 move to a location adjacent the panel 54 to transfer the package between the delivery vehicle 32 and the room R, based on the delivery vehicle location data.

The delivery vehicle 32 may also include control and drive components, such as electrical, mechanical, and/or hydraulic controls for controlling operation of the delivery vehicle 32 in accordance with operation instructions, and motors and/or engines for accomplishing the functions of the delivery vehicle 32. This may include autonomous travel, aligning with the autonomous vehicle 36, and/or coupling and uncoupling with the autonomous vehicle 36, under the control of the vehicle processor 124 and vehicle control components.

The panel assembly 42 preferably provides elements of the control system 34, including the panel actuators 56, wireless servo controller 58, panel transceiver 60, user interface 62, display 64, processor 66, memory 68, battery 70, line power source 72, audio speaker and microphone assembly 74, communication port 76, antenna 78, and the sensor and camera suite 80. The door lock 50 may also be provided as part of the control system 34.

The panel memory 68 may be an electronic memory storing operation instructions and other relevant information for access and use by the processor 66.

The panel memory 66 may store a look-up table or other data structure 153 for one or more packages P, which may include such information as an identifier, a location, a content, and a status for each package (see FIG. 11). Stored data may also include other information, such as item quantity contained in the package and/or a package weight.

The panel processor 66 may be an electronic processor executing one or more computer programs to control operation of the panel assembly 42 and door lock 50. The panel transceiver 60 may be an electronic transceiver facilitating communications via the communications network 138, including receiving operation instructions for the panel assembly 42 and door lock 50.

The panel transceiver 60 may facilitate bi-directional communication between the panel assembly 42 and the base station 38, delivery vehicle 32, and/or autonomous vehicle 36 via the communications network 138, including receiving operation instructions for the panel assembly 42. In one implementation, the panel assembly 42 may use the panel transceiver 60 to communicate the status of one or more packages P and/or communicate other data associated with the packages P.

The panel sensor and camera suite 80 may include one or more electronic sensors 88 and/or cameras 90 monitoring operations of the panel assembly 42 and facilitating accomplishment of the functions of the panel assembly 42, including opening and closing of the panel 54.

The panel assembly 42 may include a sensor to sense whether the autonomous vehicle 36, the package P, and/or another item is positioned within the panel opening 52. The panel assembly 42 may have one or more cameras providing images of the area outside the building B (e.g., to provide images of the delivery person and/or the delivery vehicle 32), the room interior, and/or the autonomous vehicle 36.

The door 40 preferably comprises control and actuation components that may include electrical, mechanical, and/or hydraulic controls for controlling operation of the panel assembly 42 and/or the door lock 50 in accordance with the operation instructions, and electrical, mechanical, and/or hydraulic actuators for accomplishing the functions of the panel assembly 42 and/or door lock 50. For instance, the panel assembly 42 preferably includes actuators 56 and servo controller 58 to facilitate raising and lowering of the panel 54 between the open and closed positions. The door 40 may include a suitable actuator for locking and unlocking of the door lock 50.

The autonomous vehicle 36 preferably provides elements of the control system 34, including the transceiver 96, user interface 98, display 100, processor 102, memory 104, battery 106, and the sensor and camera suite 108.

In one implementation, the autonomous vehicle may be fully autonomous, while in other implementations, the autonomous vehicle may be at least sufficiently autonomous to accomplish the functionality described herein. The autonomous vehicle may be remotely drivable and/or its operations otherwise remotely controllable in case of emergency or other special circumstances.

The vehicle memory 104 may be an electronic memory storing operation instructions and other relevant information for access and use by the vehicle processor 102.

The vehicle processor 102 may be an electronic processor executing one or more computer programs to control operation of the vehicle 36, including moving into a package transfer position relative to the delivery vehicle 32, moving into a package transfer position relative to a delivery person, transferring one or more packages between the transfer position and a position in the room R, and/or other autonomous movement/travel, such as autonomous movement along an interior space (such as a room or hallway) or an exterior space (such as a porch, driveway, walkway, or street). The vehicle transceiver 96 may facilitate bi-directional communication between the autonomous vehicle 36 and the base station 38, delivery vehicle 32, and/or the panel assembly 42 via the communications network 138, including receiving operation instructions for the autonomous vehicle 36.

The vehicle sensor and camera suite 108 may include one or more electronic sensors 114 and/or cameras 116 monitoring operations of the autonomous vehicle 36 and facilitating accomplishment of the functions of the autonomous vehicle 36, including moving into the transfer position relative to the delivery vehicle 32, moving into the transfer position relative to the delivery person, transferring one or more packages between the transfer position and a position in the room R, autonomously advancing itself through the panel opening 52, and/or other autonomous movement/travel. In particular, the autonomous vehicle 36 may include any internal and/or external sensors and/or cameras desired or needed to accomplish autonomous movement along an interior space (such as a room or hallway) or an exterior space (such as a porch, driveway, walkway, or street).

The sensors 114 may include a speed sensor configured to sense and generate speed data regarding a speed of movement of the autonomous machine across the location; a weight sensor configured to sense and/or generate weight data regarding the weight(s) of the supported package(s), a motor and/or engine sensor configured to sense and generate motor performance, a navigation sensor configured to sense and generate navigation data regarding a geographic location of the autonomous vehicle 36, one or more cameras configured to provide images of the autonomous vehicle 36 in operation, and/or an area around the autonomous vehicle 36.

The vehicle processor 102 may accomplish moving and operating the autonomous vehicle 36 at the building location in accordance with the set of operation instructions based at least in part on the speed, weight, motor, navigation, camera, and any other sensor and/or camera data.

The autonomous vehicle 36 may have external sensors and/or cameras to facilitate alignment with the delivery vehicle 32 (such as alignment sensors to sense alignment markers on the delivery vehicle) or to facilitate coupling and uncoupling with the delivery vehicle 32.

In particular, the autonomous vehicle 36 may have external sensors and/or cameras to facilitate the transfer of packages, such as alignment sensors to sense whether the autonomous vehicle 36 is properly aligned with the delivery vehicle 32. The external sensors and/or camera suite 108 may sense or provide images of the autonomous vehicle 36, delivery vehicle 32, and/or packages to facilitate coupling and uncoupling with the delivery vehicle and/or identifying and transferring packages.

Similarly, the autonomous vehicle 36 may have external sensors and/or cameras to facilitate coupling and uncoupling with the vehicle dock 150 of the base station 38. The external sensors and/or camera suite 108 may sense or provide images of the dock 150 and/or the autonomous vehicle 36 to facilitate coupling and uncoupling with the vehicle dock 150.

In one implementation, the autonomous vehicle 36 may include an alignment sensor configured to sense and generate alignment data regarding a relative position of the delivery vehicle 32, package(s) P, panel assembly 42, and/or dock 150. The delivery vehicle 32, package(s) P, panel assembly 42, and/or dock 150 may present one or more alignment markers 154 (see, e.g., FIG. 11) which the docking alignment sensor senses or images and uses to align itself therewith (e.g., during coupling or uncoupling).

The alignment markers 154 may be passive, in that they reflect, e.g., light (e.g., visual, infrared, laser), wherein the light may be initially emitted by emitters on the autonomous vehicle 36, or the alignment markers 154 may be active in that they emit, e.g., light. The processor 102 may align the autonomous vehicle 36 with the delivery vehicle 32, package(s) P, panel assembly 42, and/or dock 150 based on the alignment data from the alignment sensor. For instance, the machine processor 102 may align the autonomous vehicle 36 with the delivery vehicle 32 and facilitate transfer of a particular package between the delivery vehicle 32 and the autonomous vehicle 36.

The locations, contents, and statuses of packages may be provided in a look-up table or other data structure 153 stored in a memory of the system 30 (such as vehicle memory 104), and the processor 102 may refer to such data to identify the location of package for transfer. Additionally or alternatively, a package identification indicia or data for each package may be indicated by a bar code or other machine readable label 156 (see FIG. 11) on an exterior package surface, and the autonomous vehicle 36 may sense and/or image the label to determine or confirm the identity of the package.

The autonomous vehicle 36 may have control and drive components, such as electrical, mechanical, and/or hydraulic controls for controlling operation of the autonomous vehicle 36 in accordance with operation instructions, and motors and/or engines for accomplishing the functions of the autonomous vehicle 36, including autonomous movement along or adjacent to the transfer location (and, in some implementations, autonomous travel to and from the transfer location), aligning with the delivery vehicle 32, panel assembly 42, or dock 150, coupling and uncoupling with the delivery vehicle 32, and coupling and uncoupling with the dock 150, under the control of the processor 102 and the control components.

The mobile access device 136 may provide supplementary input and output interfaces for entering operation instructions and communicating sensor and/or camera data from the delivery vehicle 32, autonomous vehicle 36, base station 38, and/or panel assembly 42. The mobile access device 136 may be a smartphone, tablet, portable computer, or substantially any other suitable conventional or non-conventional technology. The mobile access device 136 may be used by the building occupant and/or the delivery person.

The communications network 138 may be substantially any suitable network employing substantially any suitable communications technology.

The control system 34 may include more, fewer, or alternative components and/or perform more, fewer, or alternative actions, including those discussed elsewhere herein, and particularly those discussed in the below-described computer-implemented control method.

Referring to FIGS. 5-10 and 12, an embodiment of a control method 200 is shown for facilitating delivery of one or more packages, including aligning and/or coupling the autonomous vehicle 36 relative to a delivery vehicle, and including transferring the package between the autonomous vehicle and the delivery vehicle. The control method 200 may be a corollary to the functionality of the above-described control system 34, and may be implemented using the various components of the control system 34 within the above-described example operating environment or other context. Broadly, the control method 200 may proceed substantially as follows. Some or all of the steps may be accomplished under partial or full computer control.

Operation instructions may be initially provided for at least the autonomous vehicle 36. The room occupant and/or delivery person may enter the operation instructions, and the operation instructions may be any relevant instructions, such as a start time, pause, end time, speed of movement, etc. Operation instructions may include whether or not the autonomous vehicle 36 is used to facilitate transfer of a package. Operation instructions may include whether the autonomous vehicle 36 is positioned in a transfer location outside the building B or within the room R (e.g., in a location adjacent the panel assembly) for transfer of a package. Relevant operation instructions may be similarly entered for the panel assembly 42 and/or the delivery vehicle 32.

The operation instructions may be entered at the transfer location, at the base station 38, or any other location. The operation instructions may be entered using the interface 146 or substantially any other suitable input interface. The operation instructions may be individually entered or selected from the base memory 140 or the vehicle memory 104 as a subset or full set of prior-entered operation instructions, which may modified, as desired or needed.

It will be appreciated that the control methods described herein may be used in connection with an incoming delivery process, where package(s) are delivered from a shipper (such as a supplier) at another location, via the delivery vehicle, to a person (i.e., a recipient) in the building B, and/or an outgoing delivery process, where package(s) are delivered from a person in the building B (i.e., a shipper), via the delivery vehicle, to a recipient at another location.

The system 30 may be activated to initiate and conduct a package transfer, as shown in 202. In one implementation, the delivery person or delivery vehicle may provide package identification data to the system 30 (e.g., by sending data to the base station) as part of the process to initiate a package transfer. For instance, the delivery person may manually input the data through a device (see FIG. 5). Similarly, the delivery person may position a package adjacent the door 40 so that a sensor (e.g., barcode scanner, RFID reader, etc.) and/or camera of the system 30 may collect sensor and/or camera data from the package.

The base station 38, autonomous vehicle 36, panel assembly 42, delivery vehicle 32, and/or another device associated with the delivery service may provide the sensor and/or camera used to collect the package identification data. The sensor and/or camera data may be collected from a barcode, RFID chip, or other identifying element that includes the package identifying data and is supplied with the package.

The sensor and/or camera data may be transmitted from the autonomous vehicle 36, panel assembly 42, delivery vehicle 32, and/or another device, via its corresponding transceiver, through the network 138, to the transceiver 144 of the base station 38. In this manner, the transceiver 144 of the base station 38 may be configured to receive package identification data associated with the package P and/or other data associated with package transfer.

The system 30 may then compare the package identifying data with a stored identifier to confirm that the package P corresponds with a shipment order. A processor of the system 30, such as the base processor 142, is operable to receive package identification data associated with the package P.

In particular, a processor of the system 30 is configured to access a data structure (such as data structure 152) containing an identifier for the package P. The identifier is generated in connection with creation of a shipment order. The system processor is configured to compare the identifier and the sensed package identification data to confirm a match, indicating the package corresponds with the shipment.

The system processor is also configured to open the panel 54 to allow room ingress and egress based upon confirmation that the identifier and package identification data match one another.

The system processor is also configured to have the autonomous vehicle 36 moved based upon confirmation that the identifier and package identification data match one another.

In another implementation, a package transfer may be initiated when the system 30 senses the presence of the delivery person or delivery vehicle 32. In another implementation, a package transfer may be initiated when the system 30 communicates with the delivery person or delivery vehicle 32. In another implementation, a package transfer may be initiated when an occupant of the building B manually authorizes the system 30 to begin a package transfer.

In another implementation, package location data associated with the location of the package relative to the panel may be provided to the system 30.

For instance, the autonomous vehicle 36, panel assembly 42, delivery vehicle 32, or another device associated with the delivery service may include a location sensor (e.g., a navigation sensor configured to sense and generate navigation data regarding a geographic location and/or camera) used to collect or generate the package location data, which may be sent to another part of the system 30 (e.g., by sending data to the base station). It will also be appreciated that package location data may be collected by the system 30 as part of the process to initiate a package transfer. For instance, the delivery person may position a package adjacent the door 40 so that a sensor (e.g., barcode scanner, RFID reader, etc.) and/or camera of the panel assembly 42 may collect sensor and/or camera data associated with a package location in proximity to the door 40.

The package location data provided by the sensor and/or camera data may be transmitted from the autonomous vehicle 36, panel assembly 42, delivery vehicle 32, or another device (such as a portable computer, tablet, smartphone, etc.), via its corresponding transceiver, through the network 138, to the transceiver 144 of the base station 38. For instance, package location data may be transmitted from a transceiver associated with the delivery vehicle 32, through the network 138, to the transceiver 144 of the base station 38. In this manner, the transceiver 144 of the base station 38 may be configured to receive package location data associated with the package P.

In various embodiments, the delivery vehicle 32 may have a powered loading device 158 (see FIG. 2) configured to transfer the package P into or out of the delivery vehicle 32. The loading device 158 may be operable to transfer the package to or from a transfer location adjacent the building (e.g., a porch, walkway, driveway, street, etc.). The loading device 158 may be operable to transfer the package to or from the autonomous vehicle 36. A system processor may be configured to have the autonomous vehicle 36 moved into the transfer location, which may be adjacent the delivery vehicle 32, to transfer the package between the autonomous vehicle and the delivery vehicle, based on the vehicle location data.

If the package identifier does not match the collected package identification data, the system 30 is configured to keep the panel closed, as shown in 204.

Figure 6:
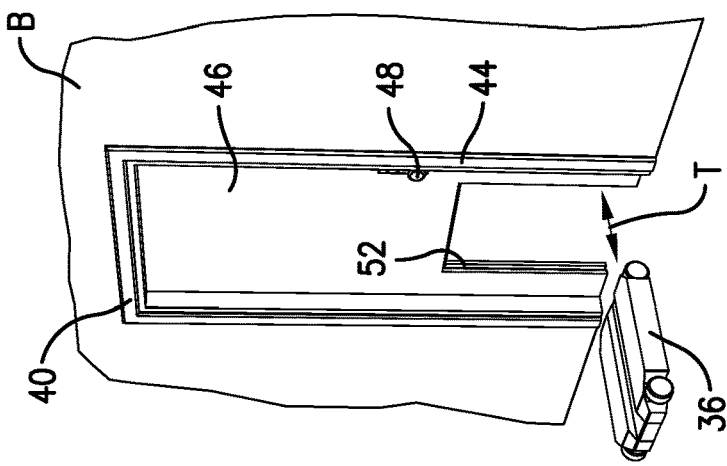
Figure 5:
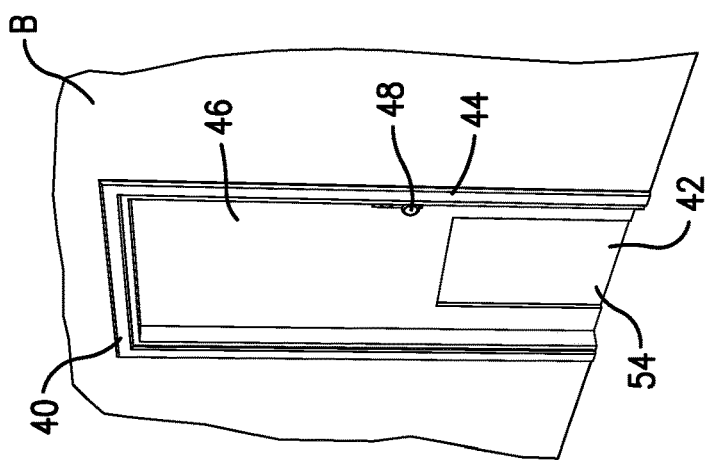
Figure 12:
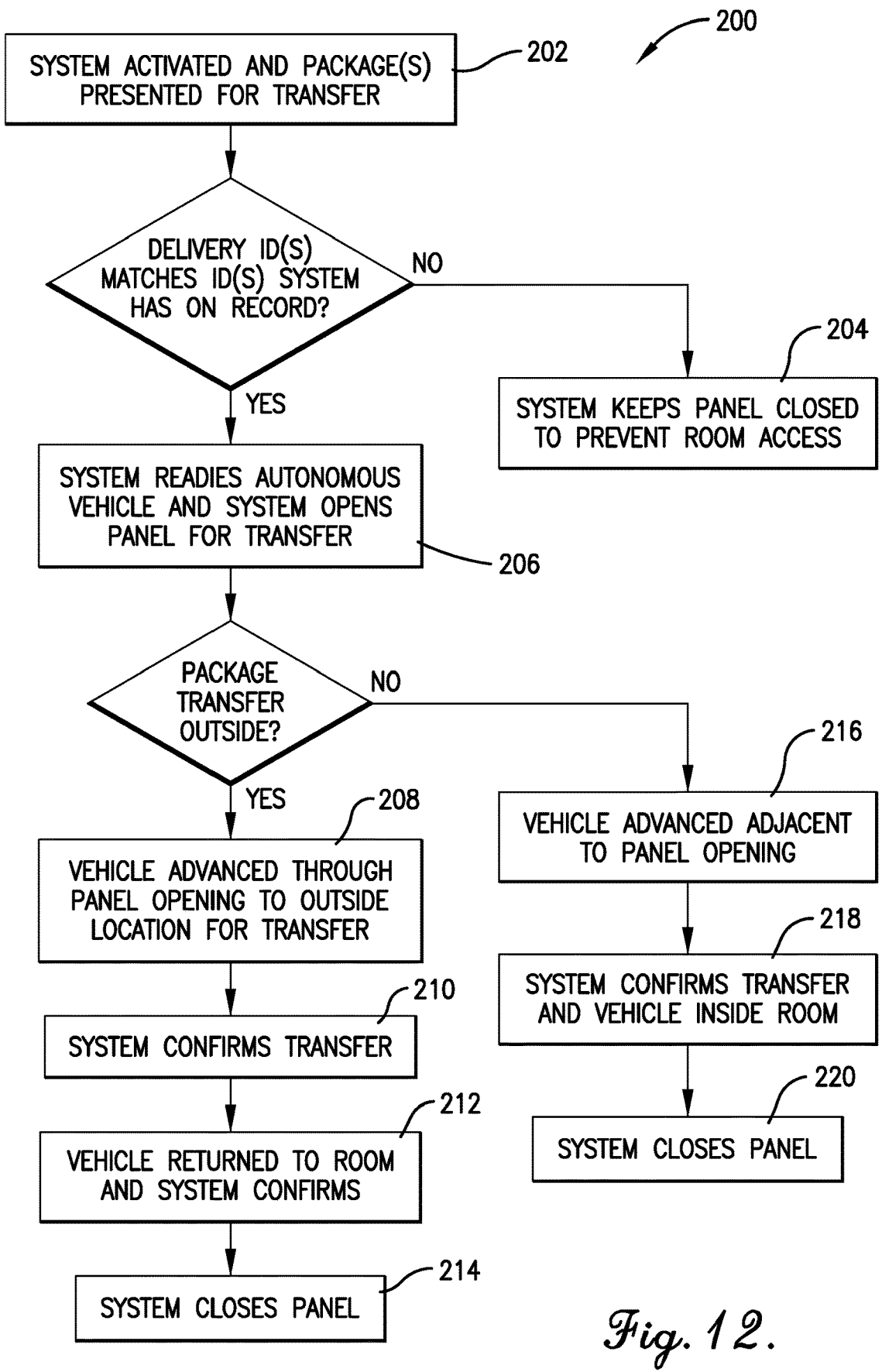
FIG. 12 is a schematic diagram of a control method of the shipping system shown in FIGS. 1-11.

If the package identifier matches the collected package identification data, the system 30 may have the panel assembly 42 open the panel 54 to permit room ingress and egress via the panel opening, as shown in 206 (see FIGS. 6 and 12). In particular, the system 30 may operate the actuators to raise the panel 54 from the closed position. In the closed position, the panel 54 is preferably secured to restrict room ingress and egress along the path T. The system 30 may stop the actuators 56 when sensor data and/or camera data confirm that the panel 54 is in the open position.

Although the panel assembly 42 is preferably configured so that the panel 54 is driven by actuators 56 between open and closed positions, the panel assembly may be alternatively configured within the scope of the present invention. An alternative panel assembly may have a panel shiftable between open and closed positions without the use of an actuator.

For instance, an alternative panel assembly may have a panel swingably supported along an upper margin that permits the panel to normally return to a closed position. In such an embodiment, the panel assembly may include a panel lock device that shifts between a locked condition, in which the panel is secured in the closed position, and an unlocked condition, in which the panel is unlocked and permitted to shift open to allow room ingress and egress along the path.

If the package identifier matches the collected package identification data, the system 30 may ready the autonomous vehicle for package transfer, see 206. For instance, if the autonomous vehicle is docked with the dock, the system 30 may have the autonomous vehicle 36 uncouple itself from the dock 150. The system 30 may have the autonomous vehicle 32 advance itself to a ready position adjacent the panel 54, where the autonomous vehicle 36 is preferably aligned with the panel opening 52.

The system 30 is configured to have the autonomous vehicle 36 align itself with the panel opening 52, another element of the panel assembly 42, and/or another element of the door 40 via alignment markers (not shown) positioned on the panel assembly 42 or another part of the door 40.

In one implementation, with the autonomous vehicle 36 in the ready position and the panel 54 opened, the autonomous vehicle 36 may be configured to receive a package or have a package removed therefrom.

In another implementation, with the autonomous vehicle 36 in the ready position and the panel 54 opened, the autonomous vehicle 36 may be configured to be advanced through the panel opening 52 for room egress to receive a package or to have a package removed.

Again, operation instructions may include whether a transfer location for the autonomous vehicle is outside the building B or within the room R. For instance, the transfer location may be outside the building B (e.g., on a porch, walkway, driveway, street, etc. adjacent the building) for receiving the package from a delivery service or providing a package for pickup by the delivery service.

Vehicle location data associated with the location of the autonomous vehicle 36 relative to the panel 54 may be provided to the system 30.

The base station 38, autonomous vehicle 36, and/or panel assembly 42, may include a sensor and/or camera used to collect vehicle location data, which may be sent to another part of the system 30 (e.g., by sending data to the base station 38). For example, the autonomous vehicle 36 may include a sensor (e.g., a navigation sensor configured to sense and generate navigation data regarding a geographic location and/or navigation camera) used to collect or generate the vehicle location data.

It will also be appreciated that package location data may be collected by the system 30 as part of the process to initiate a package transfer. For instance, the delivery person may position a package adjacent the door 40 so that a sensor (e.g., barcode scanner, RFID reader, etc.) and/or camera of the panel assembly 42 may collect sensor and/or camera data associated with a package location in proximity to the door 40.

The package location data provided by the sensor and/or camera data may be transmitted from the autonomous vehicle 36, panel assembly 42, delivery vehicle 32, or other device, via its corresponding transceiver, through the network 138, to the transceiver 144 of the base station 38. In this manner, the transceiver 144 may be configured to receive vehicle location data associated with the vehicle 36.

Package transfer data may be associated with the removal of a package P from the autonomous vehicle 36 (e.g., where the package is removed from a position supported on the vehicle or is otherwise detached or uncoupled from the vehicle 36). Similarly, package transfer data may be associated with the receipt of a package by the autonomous vehicle 36 (e.g., where the vehicle 36 supports or is otherwise connected or coupled with the package P).

The base station 38, autonomous vehicle 36, delivery vehicle 32, and/or panel assembly 42, may include a sensor and/or camera used to collect package transfer data, which may be sent to another part of the system 30 (e.g., where data is sent to the base station 38).

For example, the autonomous vehicle 36 may include a weight sensor configured to indicate a change in weight supported by the autonomous vehicle 36. In another implementation, package transfer data may be provided by sensor data (such as data from a proximity sensor) and/or camera data from the system 30 indicating an addition or removal of a package supported by or coupled relative to the autonomous vehicle 36. Associated sensor or camera data may be provided by the delivery vehicle 32, autonomous vehicle 36, panel assembly 42, and/or base station 38. In another implementation, package transfer data may be generated by manual input to a user interface of the system 30 by the delivery driver and/or a building occupant.

It will also be appreciated that package transfer data may be collected by the system 30 as part of the process to initiate a package transfer. For instance, the building occupant may position a package on the autonomous vehicle 36 so that a sensor and/or camera of the system 30 may collect sensor and/or camera data associated with package receipt on the vehicle 36.

The package transfer data provided by the sensor and/or camera data may be transmitted from the autonomous vehicle 36, panel assembly 42, delivery vehicle 32, or other device, via its corresponding transceiver, through the network 138, to the transceiver 144 of the base station 38. In this manner, the transceiver 144 may be configured to receive package transfer data associated with the package P.

If the transfer location is outside the building B, the autonomous vehicle is advanced through the panel opening 52 to the transfer location for the package transfer, as shown in 208 (see FIGS. 6 and 12). At the transfer location, the system 30 confirms that the package transfer is completed. The transfer location outside the building B may be adjacent the panel assembly 42 to receive the package.

In one implementation, package transfer completion may be confirmed, as shown in 210, by sensor data from a package transfer sensor of the system 30 configured to sense removal of the package from the autonomous vehicle 36 (e.g., where the package is removed from a position supported on the vehicle or is otherwise detached or uncoupled from the vehicle). Package transfer completion may also be confirmed by sensor data from a package transfer sensor of the system 30 configured to sense receipt of the package by the autonomous vehicle 36 (e.g., where the vehicle supports or is otherwise connected with the package).

After room egress of the autonomous vehicle 36 and while the vehicle 36 remains outside the building B, the system 30 may have the panel 54 remain open. However, for at least some embodiments of the present invention, the system 30 may have the panel 54 return to the closed position for this period.

Subsequent to confirmation of package transfer in 210, the system 30 has the autonomous vehicle returned to the room R by advancing the autonomous vehicle through the panel opening and into the room R, as shown in 212 (see FIGS. 9 and 12). In one implementation, the system 30 may sense the autonomous vehicle 36 to confirm the vehicle is inside the room R. Vehicle return may be confirmed by sensor data (e.g., from a barcode scanner or an RFID reader) and/or camera data from the system 30. Sensor or camera data confirming the vehicle location in the room R may be provided by the delivery vehicle 32, autonomous vehicle 36, panel assembly 42, base station 38, and/or another device.

In another implementation, where the package P is being received by the building occupant, the system 30 may sense the package to confirm the vehicle 36 and package are both inside the room R. Package location in the room R may be confirmed by sensor data (e.g., from a barcode scanner or an RFID reader) and/or camera data from the system 30.

Based upon a determination that the package has been transferred into or out of the room R via the path T and/or based upon confirmation of the vehicle being returned to the room R, the system 30 may have the panel assembly 42 secure the panel 54 closed to restrict room ingress and egress via the panel opening 52, as shown in 214 (see FIGS. 10 and 12).

For instance, the system 30 may operate the actuators 56 to lower the panel 54 from the open position to the closed position and secure the panel closed. The system 30 may stop the actuators 56 when sensor data and/or camera data confirm that the panel 54 is in the closed position. The system 30 may prevent the actuators 56 from lowering the panel 54 if sensor data and/or camera data identify an obstruction extending through, across, or adjacent the panel opening.

As noted above, an alternative panel assembly may have a panel that is alternatively shiftable between open and closed positions and/or is alternatively secured in the open and closed positions. For example, the panel assembly may include a panel lock device that shifts between a locked condition, in which the panel is secured in the closed position to restrict room ingress and egress, and an unlocked condition, in which the panel is unlocked and permitted to shift open to allow room ingress and egress along the path.

If the transfer location is inside the building B, the autonomous vehicle 36 may be advanced to a transfer location adjacent the panel 54 for the package transfer, as shown in 216. At the transfer location, the system 30 confirms that the package transfer is completed, see 218. Package transfer completion may be confirmed by sensor data from the system 30, as discussed above.

Upon confirmation of package transfer completion, the system 30 may have the panel assembly 42 close the panel 54 to restrict room ingress and egress via the panel opening 52, as shown in 220 (see FIG. 12). In particular, the system 30 may operate the actuators 56 to lower the panel 54. The system 30 may stop the actuators 56 when sensor data and/or camera data confirm that the panel 54 is in the open position. Again, the system 30 may prevent the actuators 56 from lowering the panel 54 if sensor data and/or camera data identify an obstruction extending through, across, or adjacent the panel opening.

For some embodiments of the present invention, a package transfer may be conducted without using an autonomous vehicle, such as the autonomous vehicle 36. For example, if the package identifier matches the collected package identification data, the system 30 may have the panel assembly 42 open the panel 54 to permit room ingress and egress via the panel opening 52. In particular, the system 30 may operate the actuators 56 to raise the panel 54. Again, the system 30 may stop the actuators 56 when sensor data and/or camera data confirm that the panel 54 is in the open position.

To transfer the package without use of an autonomous vehicle, it will be appreciated that the package P may be advanced through the panel opening 52 to a transfer location in the room R by various means. For instance, the package P may be advanced manually through the panel opening 52 by a delivery driver. The package P may also be advanced using a powered device (e.g., a vehicle, conveyor, etc.) or a manually operated device, which may or may not communicate with the system 30.

With the transfer location being inside the building B, the system 30 confirms that the package transfer is completed. Package transfer completion may be confirmed by sensor data from the system 30, as discussed above.

Upon confirmation of package transfer completion, the system 30 may have the panel assembly 42 close the panel 54 to restrict room ingress and egress via the panel opening 52. As described above, the system 30 may operate the actuators to lower the panel 54. The system 30 may stop the actuators when sensor data and/or camera data confirm that the panel is in the open position. The system 30 may prevent the actuators from lowering the panel if sensor data and/or camera data identify an obstruction extending through, across, or adjacent the panel opening.

ALTERNATIVE EMBODIMENTS

Figure 13:
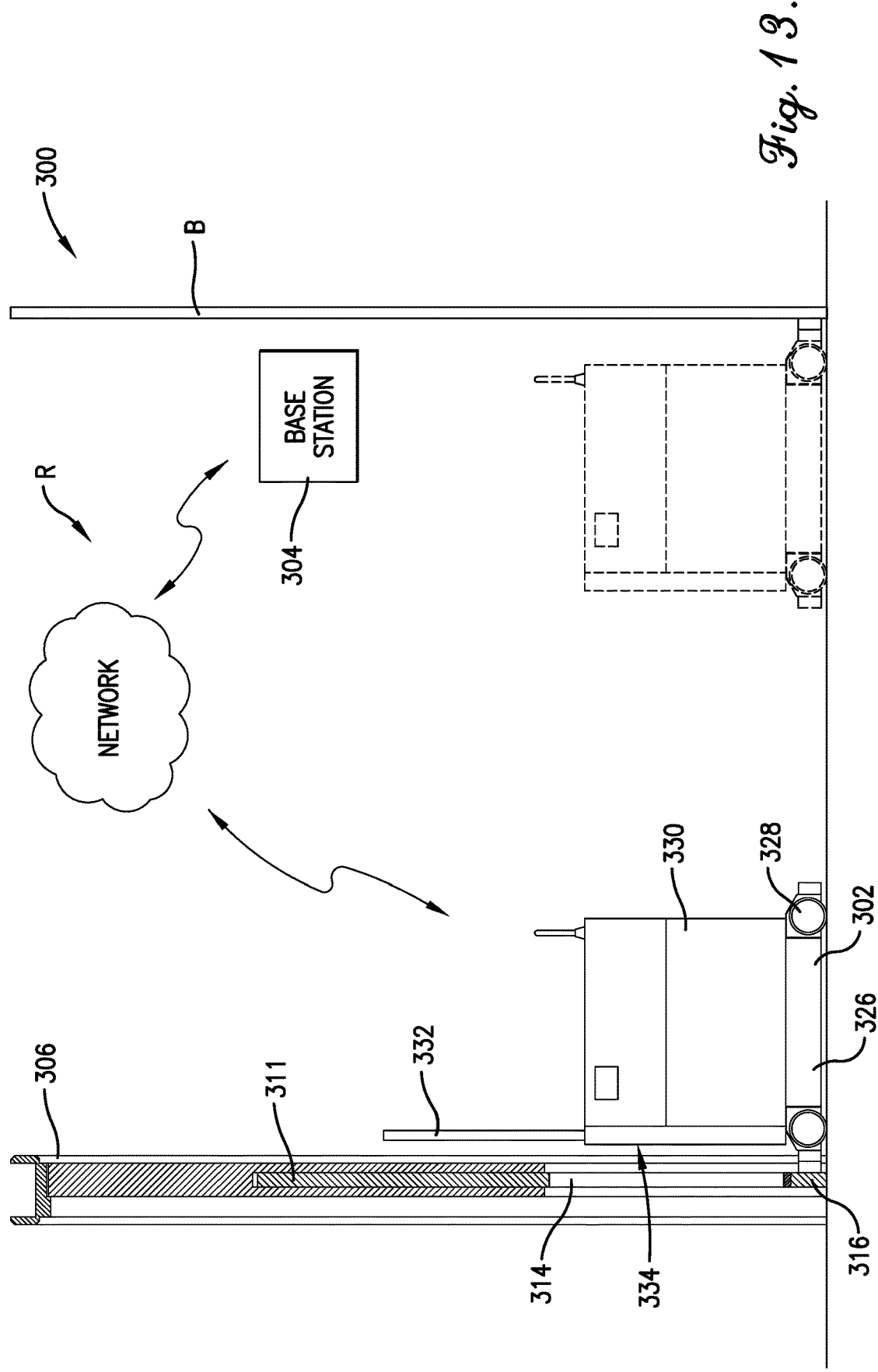
FIG. 13 is an elevational view of a shipping system constructed in accordance with a second embodiment of the present invention, showing an autonomous vehicle, door, base station, and network of the shipping system provided as part of a building, with the vehicle being located in a room of the building.
Figure 14:
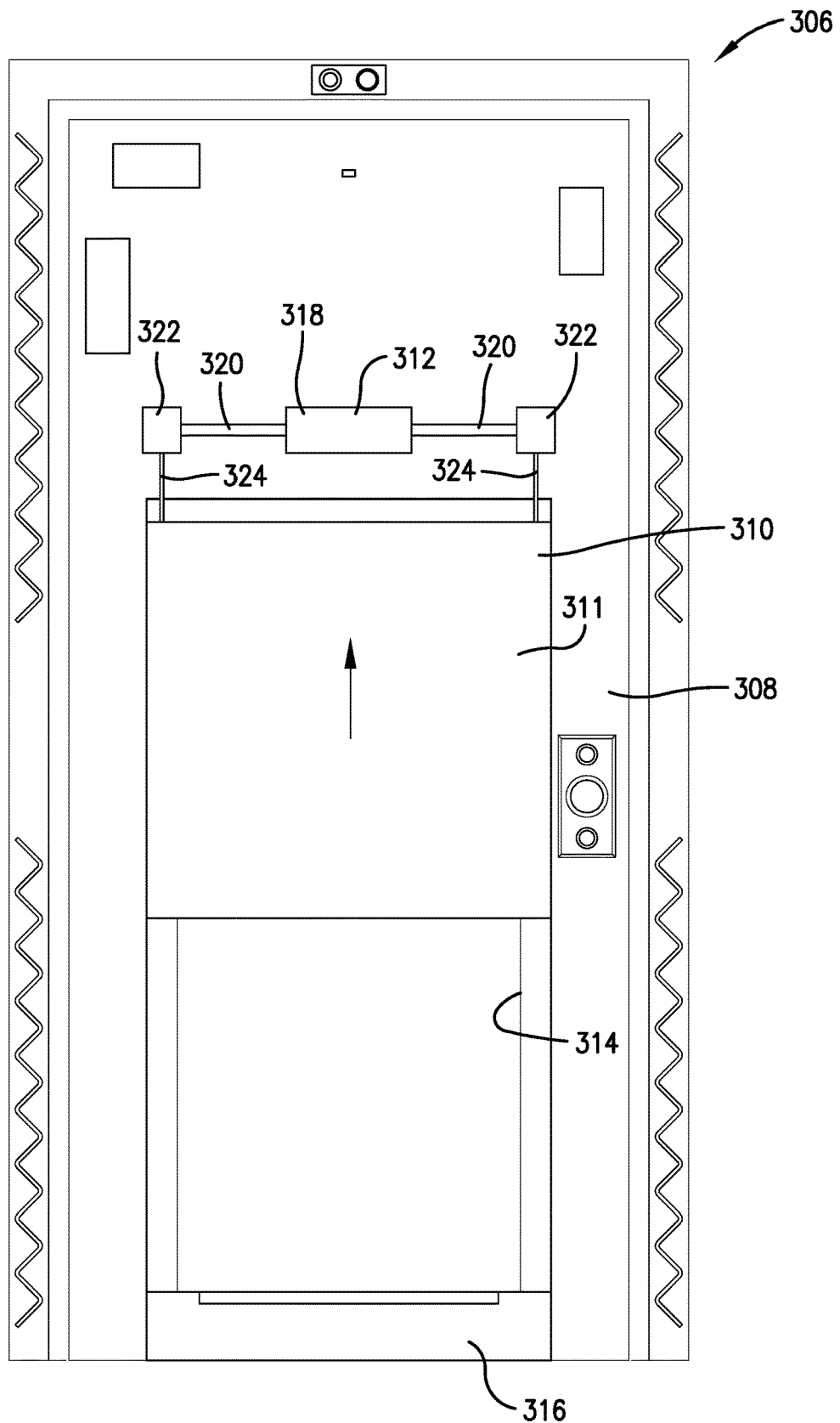
FIG. 14 is a front elevation of the door shown in FIG. 13, showing a panel assembly of the door in an open position to permit room ingress and egress.
Figure 15:
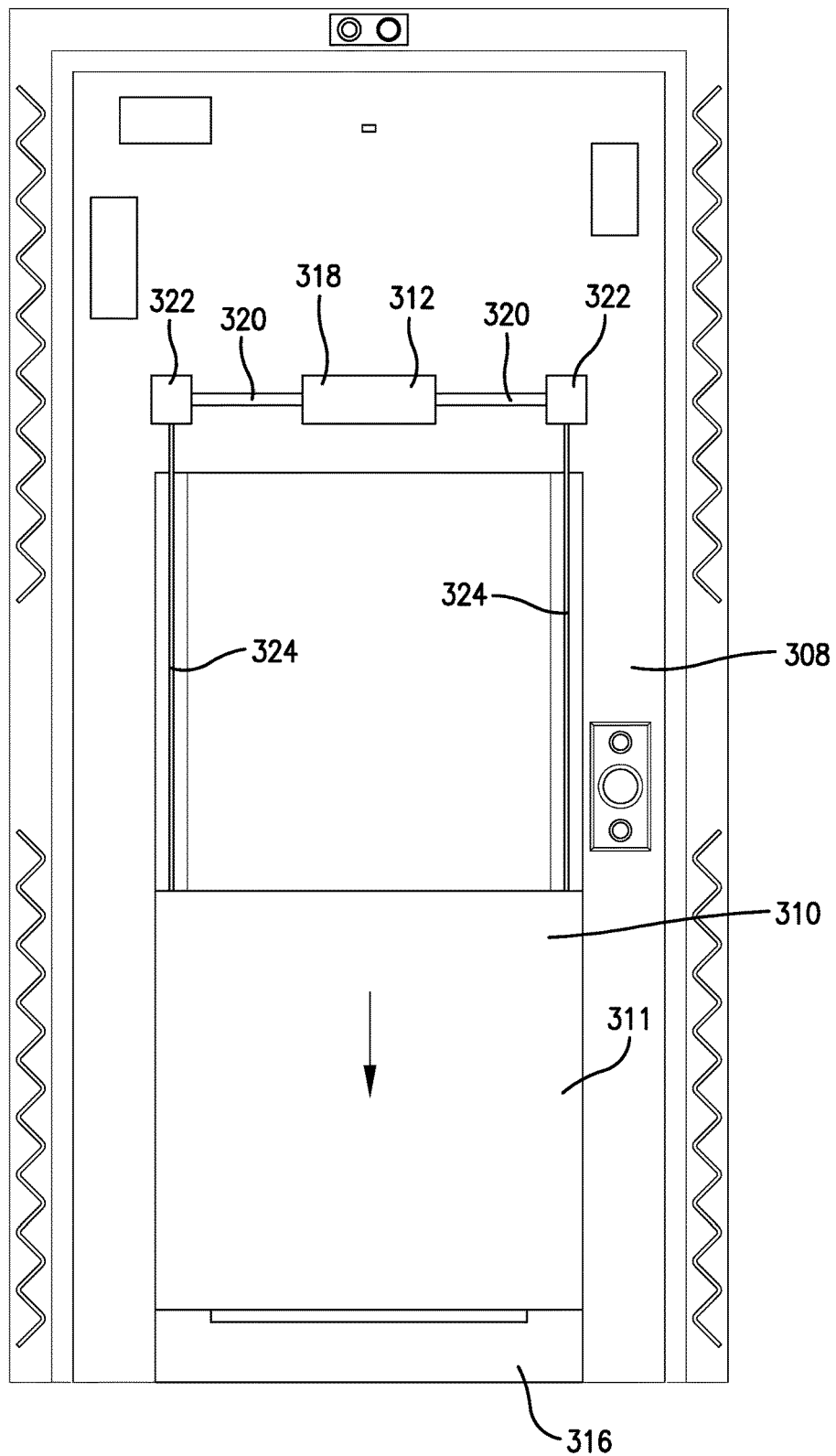
FIG. 15 is a front elevation of the door similar to FIG. 14, but showing the panel assembly of the door in a closed position to restrict room ingress and egress.
Figure 17:
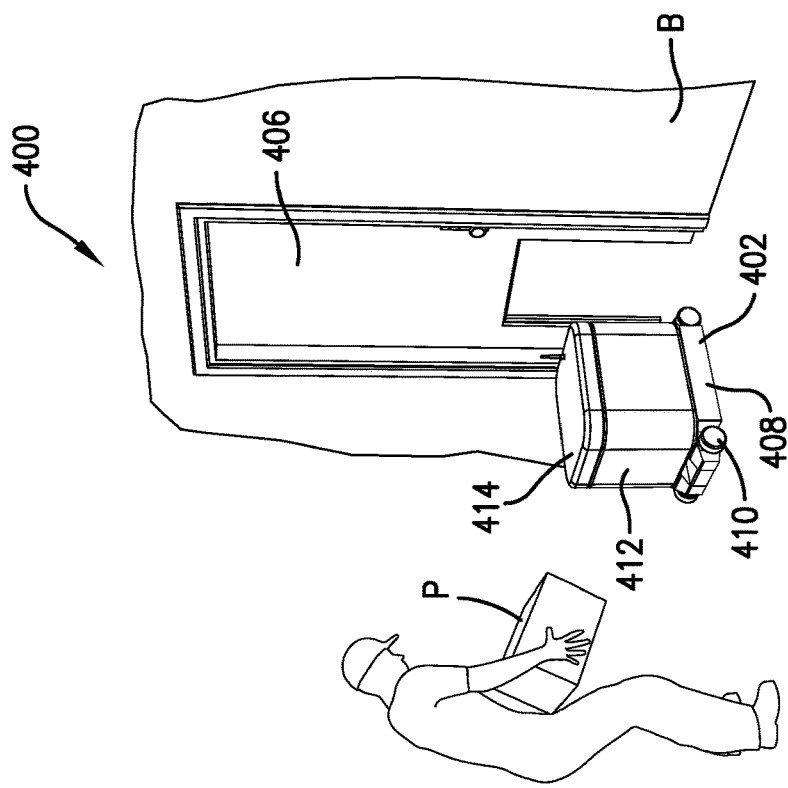
Figure 16:
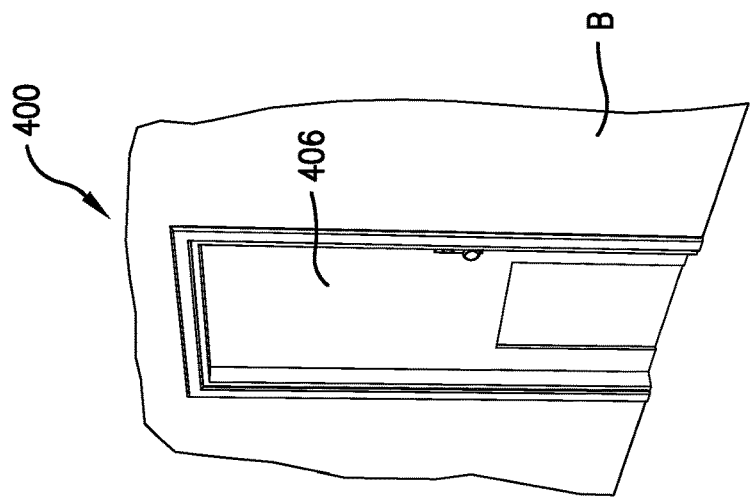

Turning to FIGS. 13-15, an alternative system 300 is constructed in accordance with a second embodiment of the present invention. The following description of system 300 will primarily describe differences of the system 300 compared to the system 30.

The alternative system 300 includes, among other things, an alternative autonomous vehicle 302, a base station 304, and an alternative door 306.

The door 306 preferably includes an alternative swingable door 308 and a powered panel assembly 310. The panel assembly 310 has an alternative shiftable panel 311 and an alternative panel actuator 312. The door 308 presents a panel opening 314 that permits room ingress and egress when the panel 310 is opened. The door 308 preferably includes a lowermost door rail 316 that defines a lower margin of the panel opening 314. The door rail 316 preferably restricts the vehicle 302 from driving through the panel opening 314, whether the panel opening 314 is opened or closed. In this manner, the door 306 is configured to restrict the vehicle 302 from room egress while permitting package transfer through the panel opening 314.

The panel actuator 312 includes an electric motor 318, a shaft 320, opposite pulleys 322 mounted on the shaft 320, and lines 324 attached to the pulleys 322 to raise and lower the panel 310.

The autonomous vehicle 302 is configured to receive and move a package P during the package transfer process. The autonomous vehicle 36 preferably includes a chassis 326, a drive train 328, and a temperature-controlled enclosure 330 supported on the chassis 326.

The enclosure 330 preferably includes an enclosure cover 332 that can be raised and lowered between open and closed positions to provide selective access to an enclosure chamber 334. The enclosure 330 preferably includes a heating and cooling device (not shown) configured to maintain the chamber 334, along with a package(s) therein, at a temperature higher or lower than room temperature.

The heating and cooling device is operably coupled to the vehicle processor and battery. Thus, the vehicle processor is configured to control heating and cooling of the chamber 334 and package(s).

Turning to FIGS. 16-23, an alternative system 400 is constructed in accordance with a third embodiment of the present invention. The following description of system 400 will primarily describe differences of the system 400 compared to the system 30.

The alternative system 400 includes, among other things, an alternative autonomous vehicle 402, an alternative delivery vehicle 404, and a door 406.

The autonomous vehicle 402 is configured to receive and move a package P during the package transfer process. The autonomous vehicle 406 preferably includes a chassis 408, a drive train 410, and an enclosure 412 supported on the chassis 408.

Figure 19:
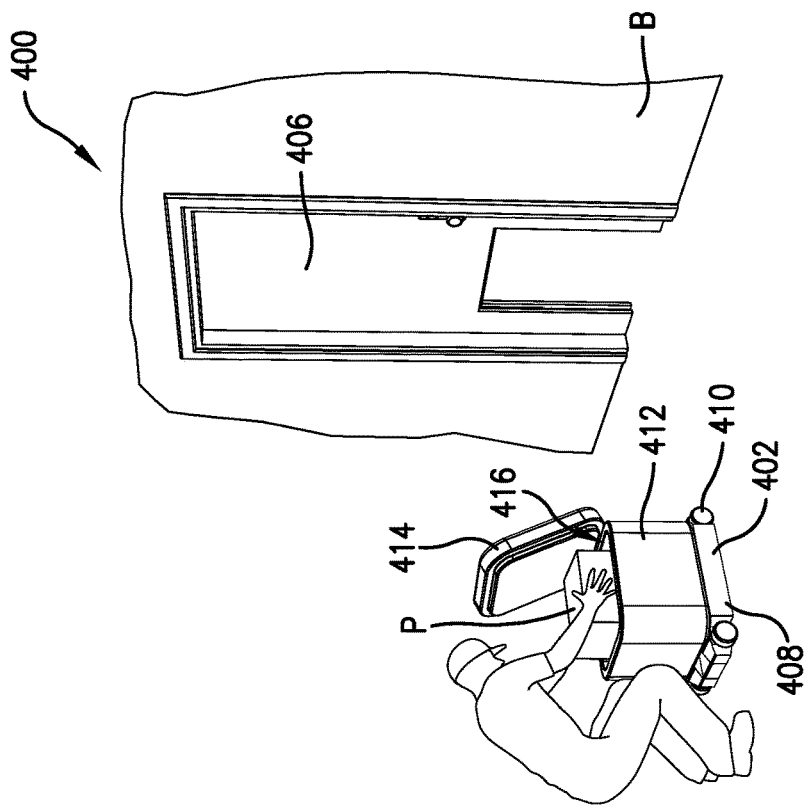
Figure 18:
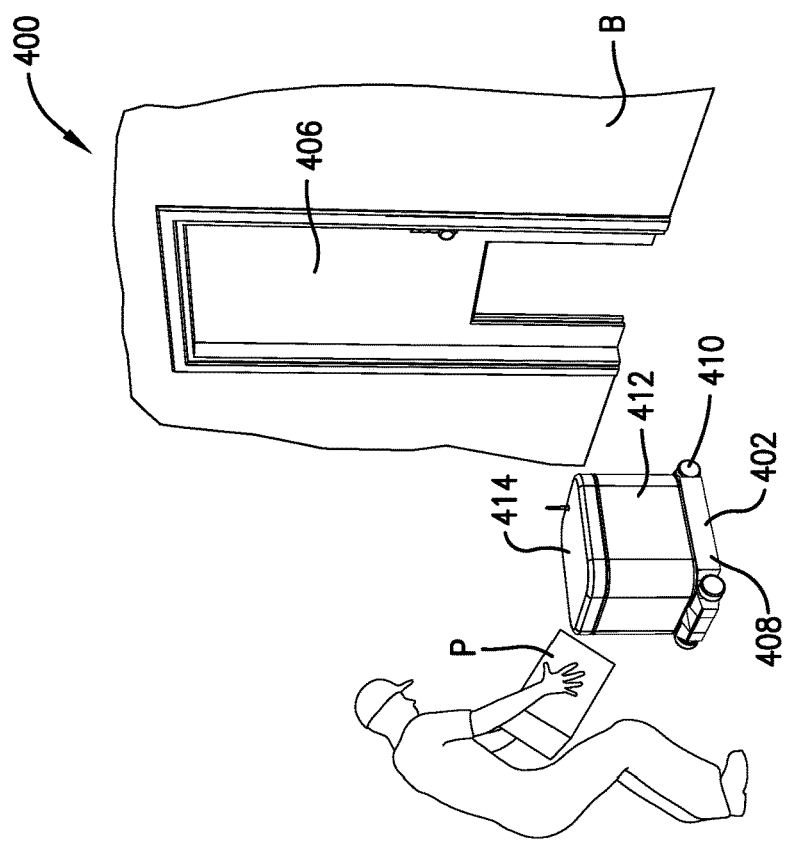
Figure 23:
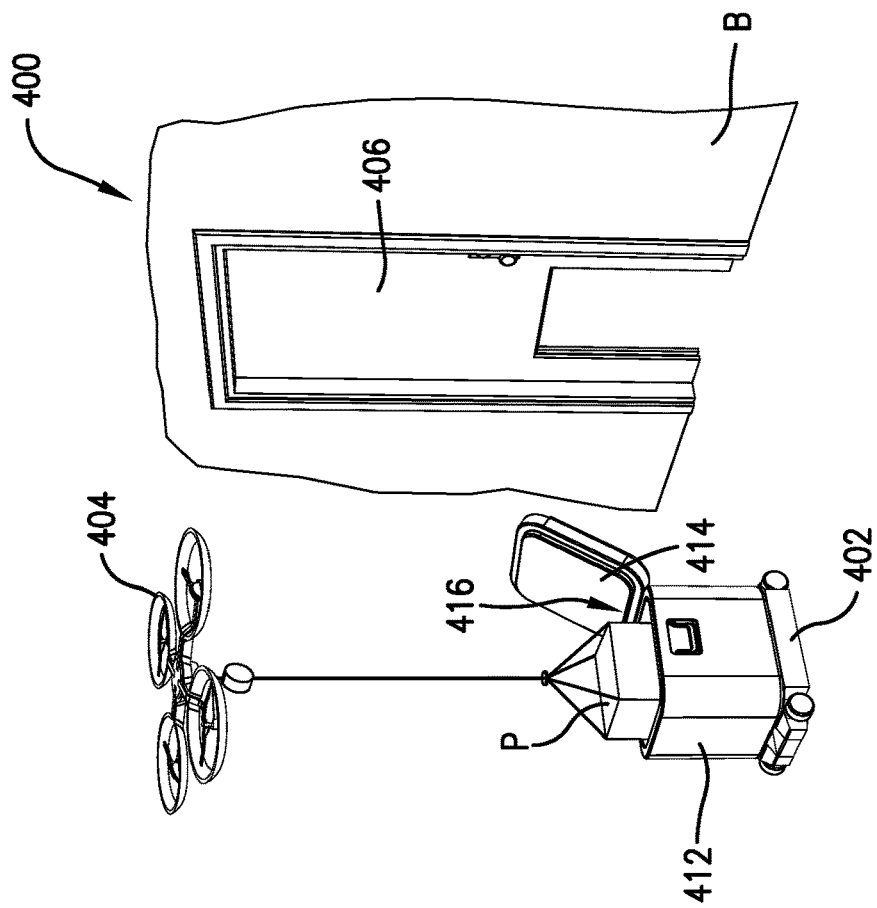
FIGS. 22 and 23 are schematic views of the shipping system similar to FIGS. 16-21, but showing an alternative delivery vehicle in the form of a flying drone used to transfer a package to the autonomous vehicle.
Figure 22:
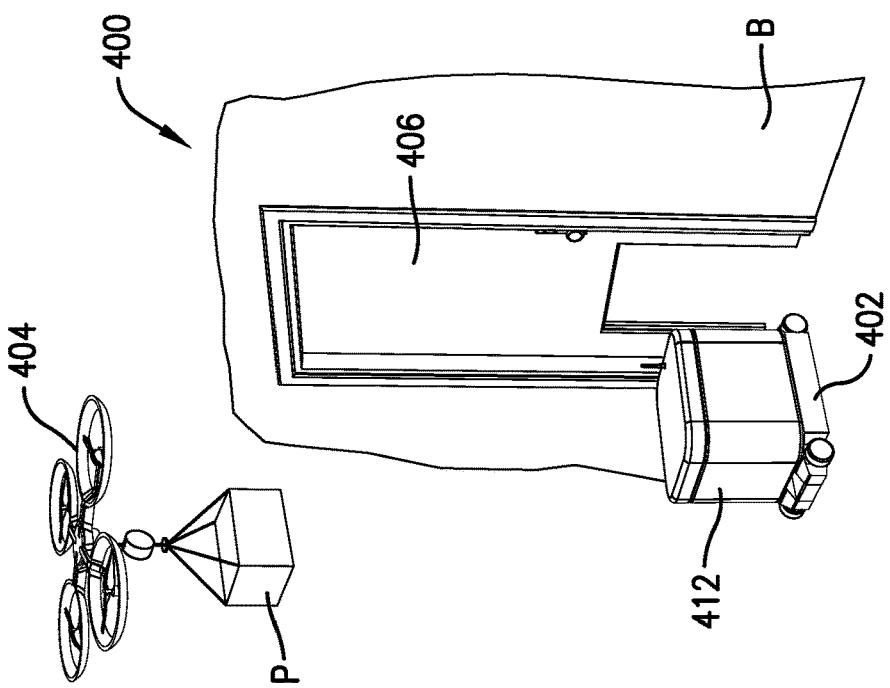
Figure 24:
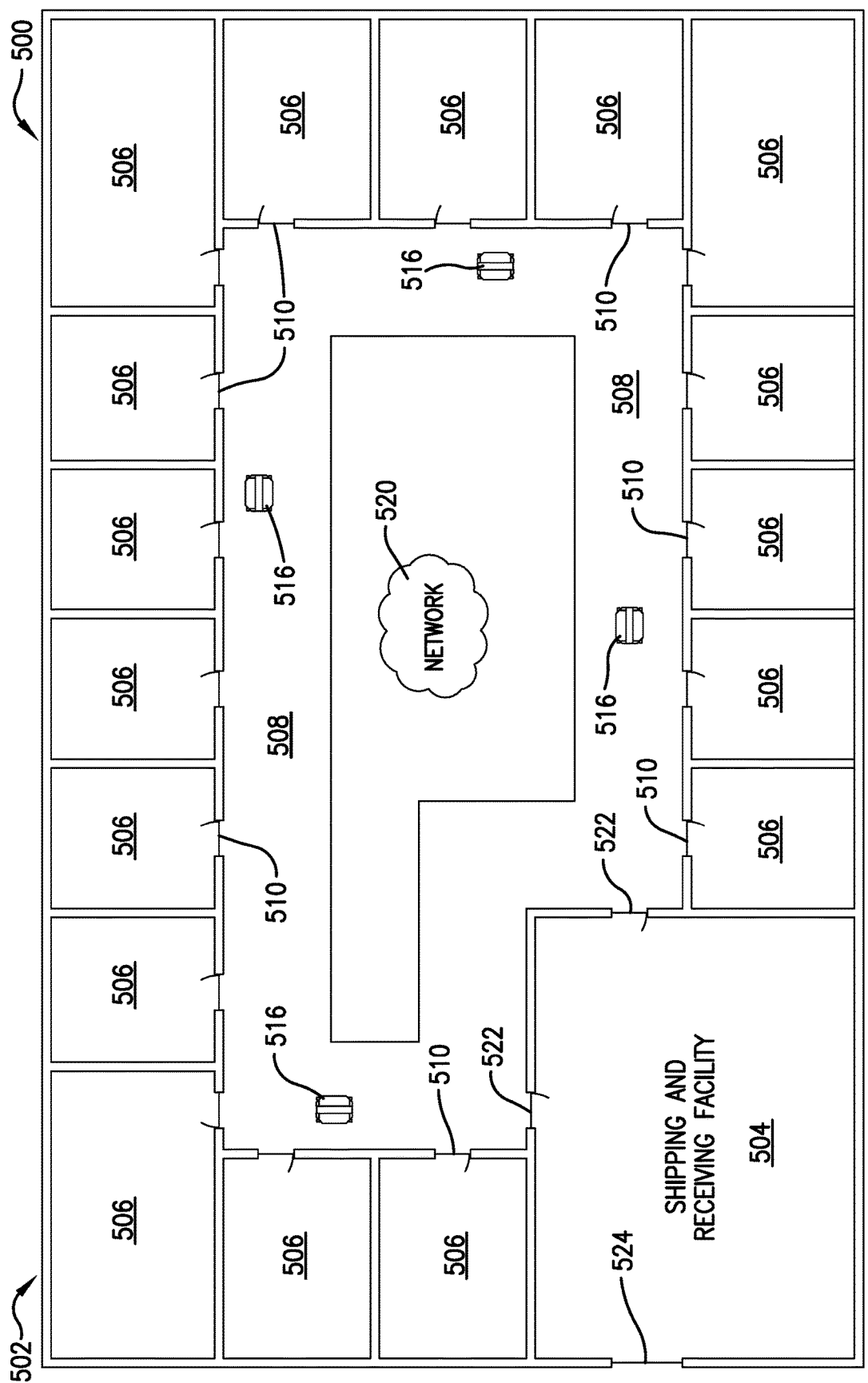
FIG. 24 is a schematic plan view of a shipping system constructed in accordance with a fourth embodiment of the present invention, with the shipping system being provided as part of a multi-tenant complex.
Figure 25:
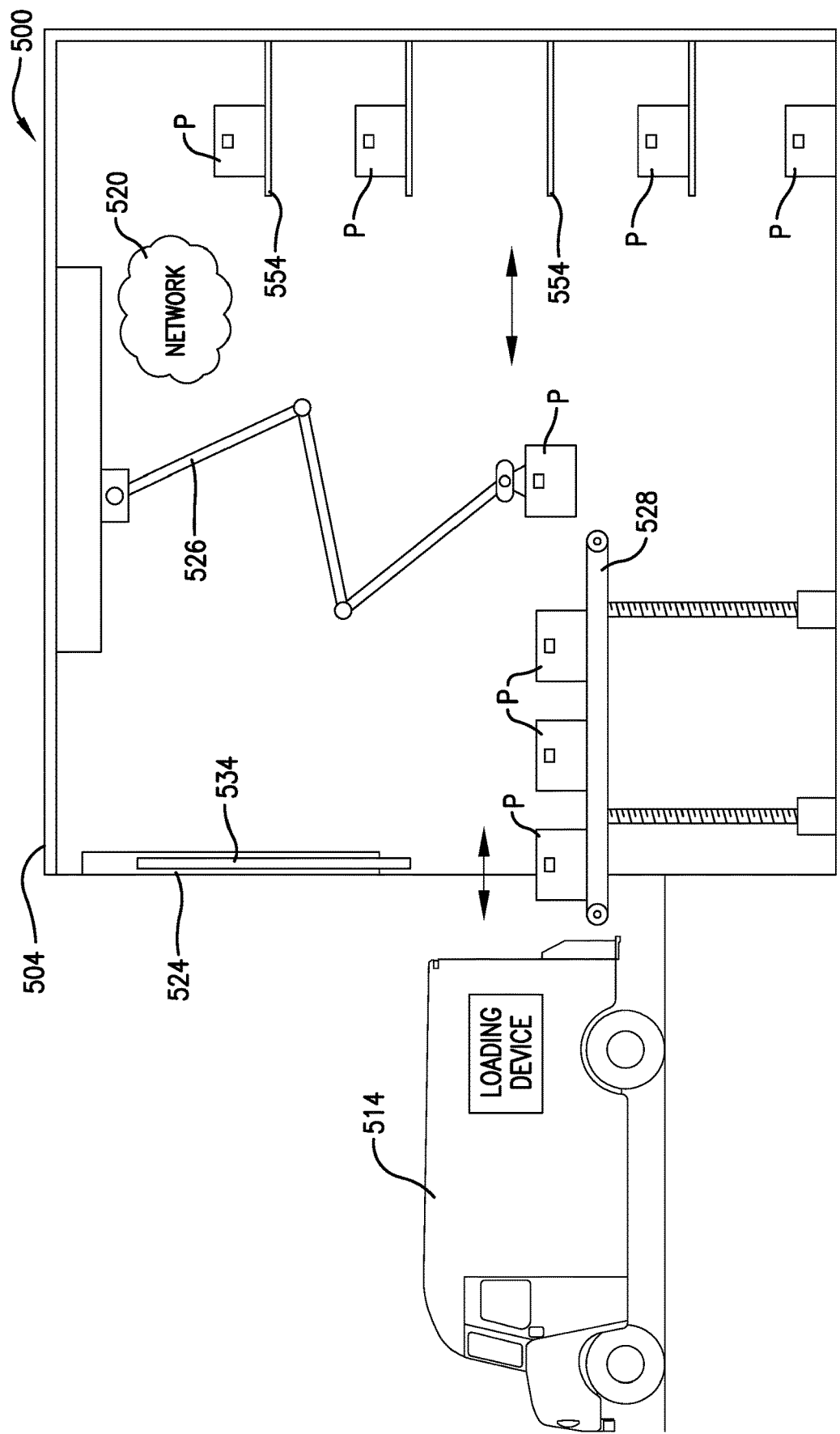
FIGS. 25 and 26 are elevational views of the shipping system shown in FIG. 24, showing the shipping system in a shipping and receiving facility of the building.
Figure 26:
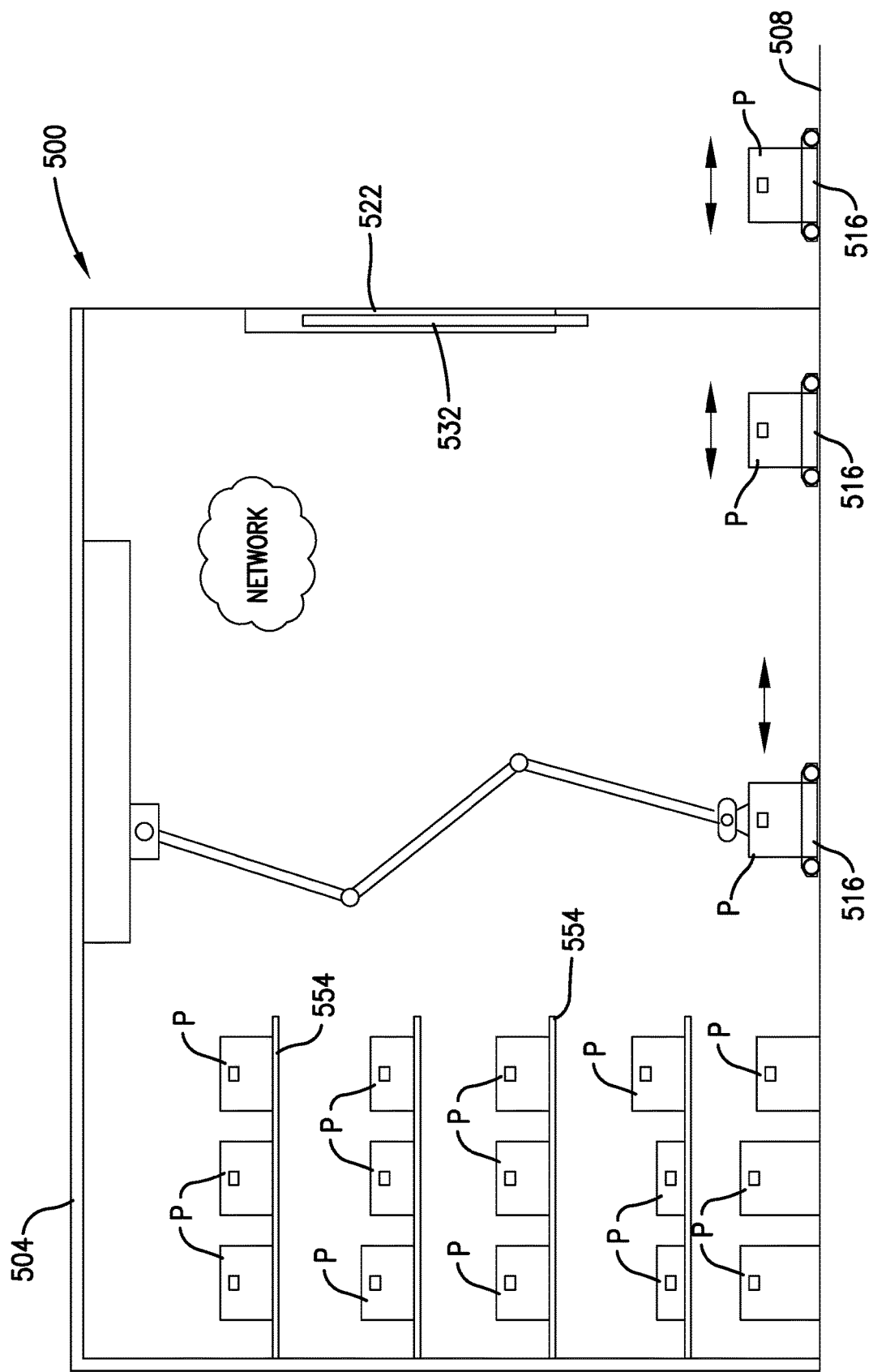
Figure 27:
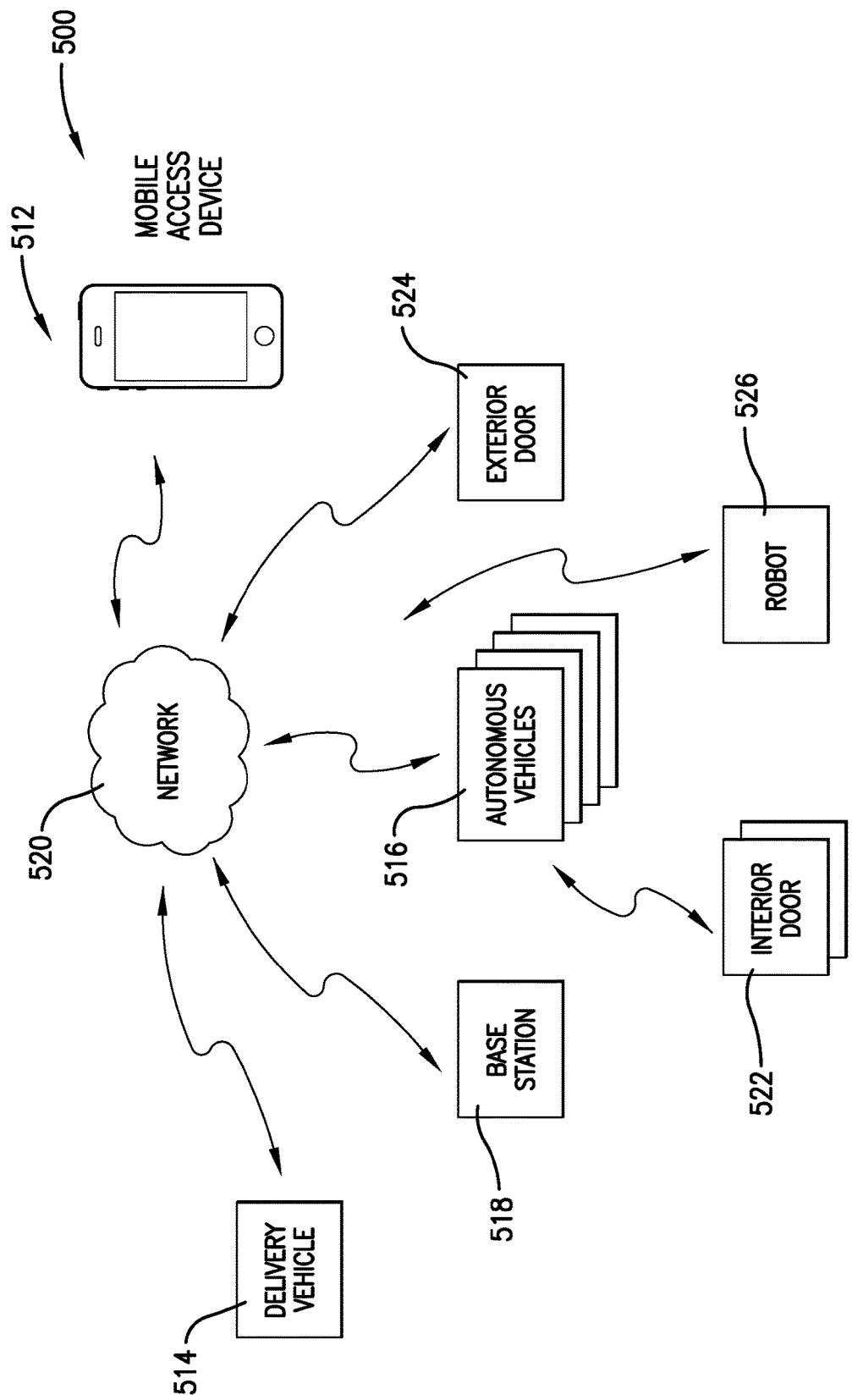
FIGS. 27-29 are schematic views of the shipping system shown in FIGS. 24-26.
Figure 29:
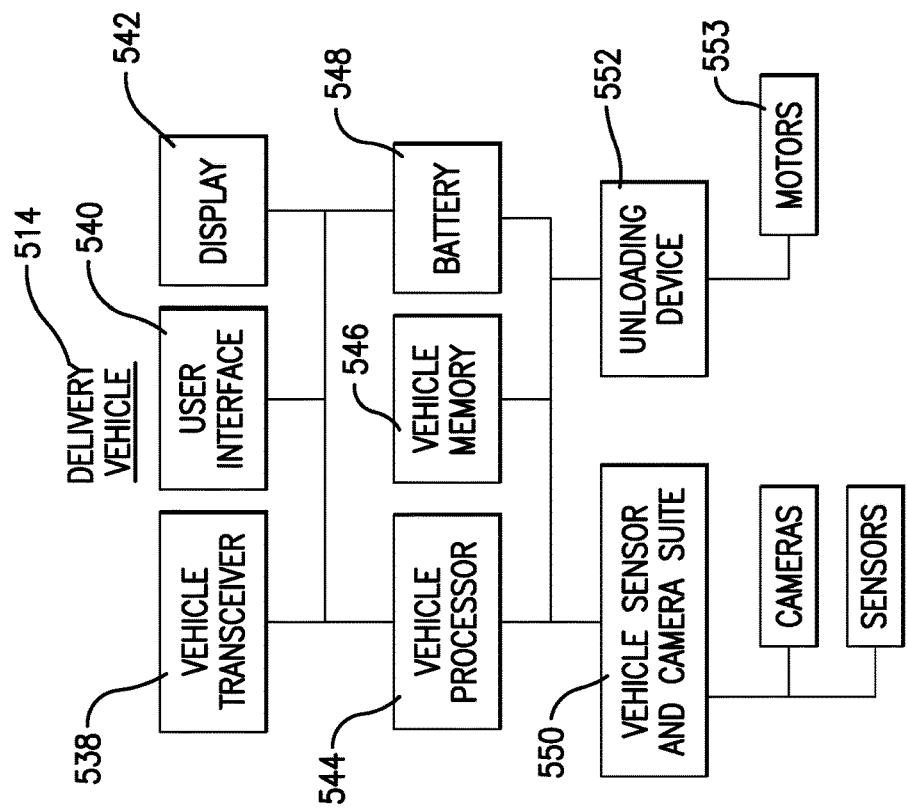
Figure 28:
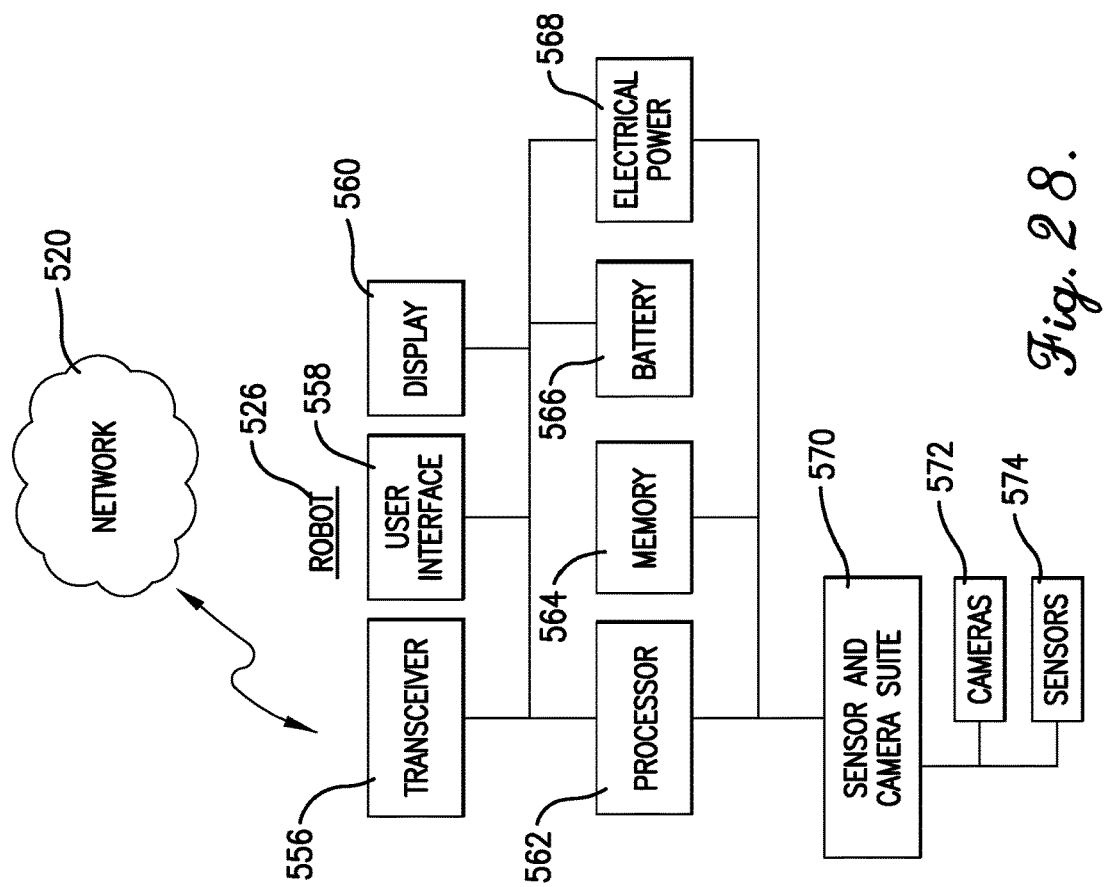

The enclosure 412 preferably includes a powered enclosure lid 414 that can be swung between open and closed positions to provide selective access to an enclosure chamber 416 (see FIG. 19). For instance, the lid 414 can be swung open for manual transfer of a package for receipt by the enclosure 412 (see FIGS. 16-21). However, the enclosure 412 may also be swung open for automated transfer of a package to the enclosure by the delivery vehicle 404. The depicted delivery vehicle 404 preferably comprises an autonomous drone configured to deposit the package in the chamber of the enclosure 412 (see FIGS. 22 and 23).

Alternative embodiments of an autonomous wheeled vehicle may be configured to support various devices for other tasks or functions inside or outside the building. For instance, alternative vehicle embodiments may have a chassis configured to be selectively coupled and uncoupled with one of multiple devices or systems that perform corresponding tasks, such as transporting an item within the building. In one such embodiment, the vehicle may be configured to support a fire extinguishing system (not shown) configured to autonomously deploy itself for extinguishing a fire in the building when the fire is sensed by the system.

Turning to FIGS. 24-30, an alternative shipping system 500 is constructed in accordance with a fourth embodiment of the present invention. The following description of system 500 will primarily describe differences of the system 500 compared to the system 30.

The shipping system 500 is preferably used in association with a multi-tenant complex 502. The depicted complex 502 includes a secure shipping and receiving facility 504 and a series of secure spaces/rooms 506 associated with corresponding tenants/occupants. The facility 504 and rooms 506 are accessible along a walkway 508.

In preferred embodiments, the complex 502 may comprise a single building that houses the facility 504, rooms 506, and walkway 508. In other preferred embodiments, the complex 502 may include multiple buildings that cooperatively house the facility 504 and rooms 506. In various embodiments, it will be appreciated that the walkway 508 or another transportation area connecting the facility 504 and rooms 506 may be located inside a building of the complex 502, outside any building of the complex 502, or have parts located inside and outside.

Each room 506 is preferably associated with a room door 510 having a panel assembly (similar to door 40) that provides secure access to the room 506 from the walkway 508 for package transfer.

The shipping system 500 includes a control system 512 for controlling package transfers associated with the facility 504 and the rooms 506. The shipping system 500 also preferably includes a delivery vehicle 514, autonomous vehicles 516, a base station 518, room doors 510, and a network 520. Yet further, the shipping system 500 preferably includes interior facility doors 522, exterior facility door 524, facility robot 526, and conveyor 528.

The interior facility doors 522 each preferably comprise a powered panel assembly 532 (similar to panel assembly 42) to selectively provide a path between the facility 504 and the walkway 508 for facility ingress and egress. The panel assembly 532 facilitates transportation of package(s) P between the facility 504 and the walkway 508 outside the facility 504 (e.g., for package transfer with one or more of the rooms 506.

In a similar manner, the exterior facility door 524 preferably comprises a powered panel assembly 534 (similar to panel assembly 42) to selectively provide a path into and out of the facility 504 for facility ingress and egress. The panel assembly 534 facilitates transfer of package(s) P between the facility 504 and the delivery vehicle 514 outside the facility 504. The facility doors 524,526, including the panel assemblies 532,534, provide elements of the control system 512, similar to the door 40 in the first embodiment described above.

The delivery vehicle 514 preferably provides elements of the control system 512, including a transceiver 538, user interface 540, display 542, processor 544, memory 546, battery 548, and the sensor and camera suite 550.

The delivery vehicle 514 may also have a powered loading device 552 configured to transfer package(s) P into or out of the delivery vehicle 514. The loading device 552 may include one or more motors 553 and may be operable to transfer the package(s) to or from the conveyor 528 and/or the robot 526. A system processor may be configured to have the conveyor 528 and/or robot 526 moved into a transfer location, which may be adjacent the delivery vehicle 514, to transfer the package(s) between locations in the facility 504 (such as shelving or racks 554) and the delivery vehicle 514, based on the vehicle location data.

The robot 526 is configured to carry and transport one or more package(s) P within the facility 504. The robot 526 preferably provides elements of the control system 512, including a transceiver 556, user interface 558, display 560, processor 562, memory 564, battery 566, a line power source 568, and a sensor and camera suite 570 with cameras 572 and sensors 574.

In one implementation, the robot 526 may be fully autonomous, while in other implementations, the robot 526 may be at least sufficiently autonomous to accomplish the functionality described herein. The robot 526 may be remotely controllable (e.g., in case of emergency or other special circumstances).

The memory 564 may be an electronic memory storing operation instructions and other relevant information for access and use by the processor 562.

The processor 562 may be an electronic processor executing one or more computer programs to control operation of the robot 526, including moving into a package transfer position relative to the delivery vehicle 514 and/or conveyor 528, moving into a package transfer position relative to a delivery person, moving into the transfer position relative to an autonomous vehicle 516, transferring one or more packages between the transfer position and a position in the facility 504 (e.g., a position on shelving 554), and/or other autonomous movement/travel. The transceiver 556 may facilitate bi-directional communication between the robot 526 and the base station 518, delivery vehicle 514, and/or the panel assembly 534 via the communications network 520, including receiving operation instructions for the robot 526.

The robot sensor and camera suite 570 may include one or more electronic cameras 572 and/or sensors 574 monitoring operations of the robot 526 and facilitating accomplishment of the functions of the robot 526, including moving into the transfer position relative to the delivery vehicle 514 and/or conveyor 528, moving into the transfer position relative to an autonomous vehicle 516, moving into the transfer position relative to the delivery person, transferring one or more packages between the transfer position and a position in the facility 504 (e.g., a position on shelving 554), and/or other autonomous movement/travel. In particular, the robot 526 may include any internal and/or external sensors and/or cameras desired or needed to accomplish autonomous movement within the facility.

The sensors 570 may include a speed sensor configured to sense and generate speed data regarding a speed of movement of the robot 526 across a location; a weight sensor configured to sense and/or generate weight data regarding the weight(s) of the supported package(s), a motor and/or engine sensor configured to sense and generate motor performance, a navigation sensor configured to sense and generate navigation data regarding a geographic location of the robot 526, one or more cameras configured to provide images of the robot 526 in operation, and/or an area around the robot 526.

The processor 562 may accomplish moving and operating the robot 526 within the facility 504 in accordance with the set of operation instructions based at least in part on the speed, weight, motor, navigation, camera, and any other sensor and/or camera data.

The robot 526 may have external sensors and/or cameras to facilitate alignment and/or engagement with the delivery vehicle 514 (such as alignment sensors to sense alignment markers on the delivery vehicle), the conveyor 528, and/or package(s) P, and/or to facilitate coupling and uncoupling with the delivery vehicle 514, conveyor 528, an autonomous vehicle 516, and/or package(s) P.

In particular, the robot 526 may have external sensors and/or cameras to facilitate the transfer of packages, such as alignment sensors to sense whether the robot 526 is properly aligned and engaged with the delivery vehicle 514, the conveyor 528, and/or package(s) P moving through the door 524. The external sensors and/or camera suite 570 may sense or provide images of the robot 526, delivery vehicle 514, the conveyor 528, and/or package(s) P to facilitate alignment, engagement, coupling and uncoupling, and/or identifying and transferring package(s).

The robot 526 may also have external sensors and/or cameras to facilitate alignment with an autonomous vehicle 516 (such as alignment sensors to sense alignment markers on the autonomous vehicle) and/or to facilitate coupling and uncoupling with the autonomous vehicle 516 and/or package(s) P.

In particular, the robot 526 may have external sensors and/or cameras to facilitate the transfer of packages, such as alignment sensors to sense whether the robot 526 is properly aligned and engaged with the autonomous vehicle 516 and/or package(s) P moving through a door 522. The external sensors and/or camera suite 570 may sense or provide images of the robot 526, autonomous vehicle 516, and/or package(s) P to facilitate alignment, engagement, coupling and uncoupling, identifying package(s), and/or transferring package(s).

In one implementation, the robot 526 may include an alignment sensor configured to sense and generate alignment data regarding a relative position of the delivery vehicle 514, package(s) P, panel assemblies 532,534, autonomous vehicle 516, and/or conveyor 528. The delivery vehicle 514, package(s) P, panel assemblies 532,534, autonomous vehicle 516, and/or conveyor 528 may present one or more alignment markers which the docking alignment sensor senses or images and uses to align itself therewith (e.g., during alignment, engagement, coupling and uncoupling, identifying package(s), and/or transferring package(s)).

The processor 562 may align the robot 526 with the delivery vehicle 514, package(s) P, panel assemblies 532, 534, autonomous vehicle 516, and/or conveyor 528 based on the alignment data from the alignment sensor. For instance, the processor 562 may align the robot 526 with the delivery vehicle 514 and/or conveyor 528 to facilitate transfer of a package between the robot 526 and the facility 504. Similarly, the processor 562 may align the robot 526 with an autonomous vehicle 516 to facilitate transfer of a package between the robot 526 and the autonomous vehicle 516.

The locations, contents, and statuses of packages may be provided in a look-up table or other data structure stored in a memory of the system 500, and the processor 562 may refer to such data to identify the location of package for transfer. Additionally or alternatively, a package identification indicia or data for each package may be indicated by a bar code or other machine readable label on an exterior package surface, and the robot 526 may sense and/or image the label to determine or confirm the identity of the package.

The robot 526 may have control and drive components, such as electrical, mechanical, and/or hydraulic controls for controlling operation of the robot 526 in accordance with operation instructions, and motors and/or engines for accomplishing the functions of the robot 526, including autonomous movement along or adjacent to the transfer location, aligning and/or engaging with the delivery vehicle 514, package(s) P, panel assemblies 532,534, autonomous vehicle 516 and/or conveyor 528, or coupling and uncoupling with the delivery vehicle 514, package(s) P, panel assemblies 532,534, autonomous vehicle 516, and/or conveyor 528, under the control of the processor 562 and the control components.

Robot location data associated with the location of the robot 562 (e.g., relative to the delivery vehicle 514, package(s) P, panel assemblies 532,534, autonomous vehicle 516 and/or conveyor 528) may be provided to the system 500.

The base station 518, robot 526, delivery vehicle 514, panel assemblies 532,534, and/or autonomous vehicle 516 may include a sensor and/or camera used to collect robot location data, which may be sent to another part of the system 500 (e.g., by sending data to the base station 518). For example, the robot 526 may include a sensor (e.g., a navigation sensor configured to sense and generate navigation data regarding a geographic location and/or navigation camera) used to collect or generate the robot location data.

It will also be appreciated that robot location data may be collected by the system 500 as part of the process to initiate a package transfer.

Figure 30:
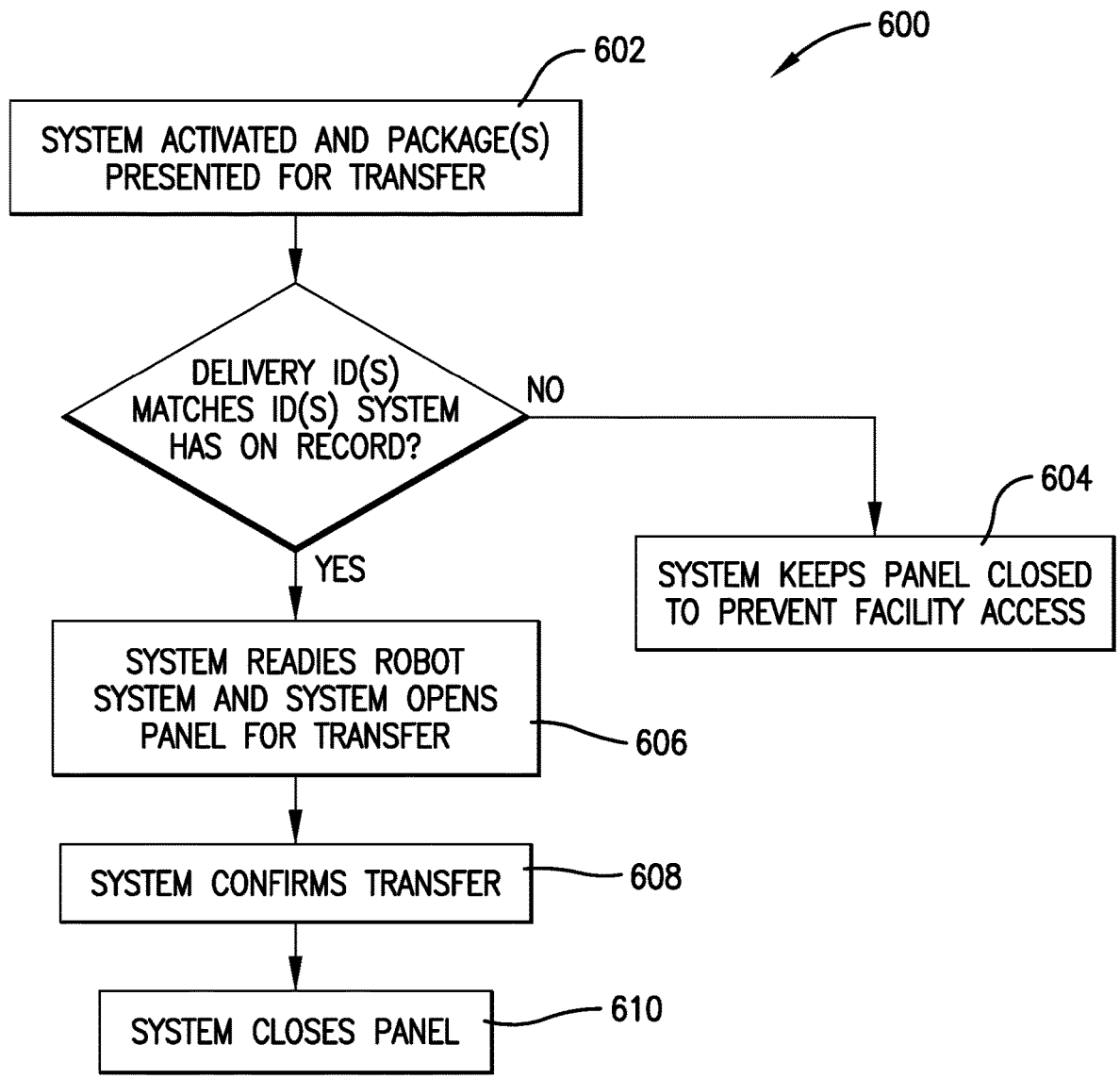
FIG. 30 is a schematic diagram of a control method of the shipping system shown in FIGS. 24-29.

Referring to FIG. 30, an embodiment of a control method 600 is shown for facilitating delivery of one or more packages relative to the facility 504. It will be appreciated that the control methods described herein may be used in connection with an incoming delivery process, where package(s) are delivered from a shipper (such as a supplier) at another location, via the delivery vehicle, to a person (i.e., a recipient) in the complex 502, and/or an outgoing delivery process, where package(s) are delivered from a person in the complex 502 (i.e., a shipper), via the delivery vehicle, to a recipient at another location. Furthermore, the described control methods may be used in connection with a delivery process where package(s) are delivered from a shipper in the complex 502 to a recipient in the complex 502.

The system 500 may be activated to initiate and conduct a package transfer, as shown in 602. In one implementation, the delivery person or delivery vehicle may provide package identification data to the system 500 (e.g., by sending data to the base station) as part of the process to initiate a package transfer. For instance, the delivery person may manually input the data through a device (see FIG. 5). Similarly, the delivery person may position a package adjacent the facility 504 so that a sensor (e.g., barcode scanner, RFID reader, etc.) and/or camera of the system 500 may collect sensor and/or camera data from the package.

The base station 518, autonomous vehicle 516, panel assembly 532,534, delivery vehicle 514, and/or another device associated with the delivery service may provide the sensor and/or camera used to collect the package identification data. The sensor and/or camera data may be collected from a barcode, RFID chip, or other identifying element that includes the package identifying data and is supplied with the package.

The sensor and/or camera data may be transmitted from the autonomous vehicle 516, panel assembly 532,534, delivery vehicle 514, and/or another device, via its corresponding transceiver, through the network 520, to the transceiver of the base station 518. In this manner, the transceiver of the base station 518 may be configured to receive package identification data associated with the package P and/or other data associated with package transfer.

The system 500 may then compare the package identifying data with a stored identifier to confirm that the package P corresponds with a shipment order. A processor of the system 500 is operable to receive package identification data associated with the package P.

If the package identifier does not match the collected package identification data, the system 500 is configured to keep the panel closed, as shown in 604.

If the package identifier matches the collected package identification data, the system 500 may have the panel assembly 532,534 open the panel to permit room ingress and egress via the panel opening, as shown in 606.

If the package identifier matches the collected package identification data, the system 500 may ready the robot 526 for package transfer, see 606. The system 500 may have the robot 526 advance itself to a ready position adjacent the respective panel assembly 532,534, where the robot 526 may be aligned with the corresponding panel opening.

The system 500 is configured to have the robot 526 align itself with the panel opening, another element of the panel assembly 532,534, and/or another structure in the facility 504 via alignment markers (not shown).

In one implementation, with the robot 526 in the ready position and the panel opened, the robot 526 may be configured to receive a package or release a package therefrom. In another implementation, with the robot 526 in the ready position and the panel opened, the robot 526 may be configured to be at least partly advanced through the panel opening for room egress to receive a package or to release a package.

Robot location data associated with the location of the robot 526 may be provided to the system 500. It will also be appreciated that package location data and/or package transfer data may be collected by the system 500 as part of the process of a package transfer.

The base station 518, autonomous vehicle 516, delivery vehicle 514, robot 526, and/or panel assembly 532,534 may include a sensor and/or camera used to collect package transfer data and/or package transfer data, which may be sent to another part of the system 500.

For example, the robot 526 may include a weight sensor configured to indicate a change in package weight supported by the robot 526. In another implementation, package transfer data may be provided by sensor data (such as data from a proximity sensor) and/or camera data from the system 500 indicating an addition or removal of a package supported by or coupled relative to the robot 526. Associated sensor or camera data may be provided by the delivery vehicle 514, autonomous vehicle 516, panel assembly 532,534, robot 526, and/or base station 518. In another implementation, package transfer data may be generated by manual input to a user interface of the system 500 by the delivery driver and/or a building occupant.

In one implementation, package transfer completion may be confirmed, as shown in 608, by sensor data from a package transfer sensor of the system 500 configured to sense transfer of the package relative to the robot 526 (e.g., where the package is released by the robot 526 onto the conveyor 528 or an autonomous vehicle 516).

Subsequent to confirmation of package transfer in 608, based upon a determination that the package(s) has been transferred into or out of the facility 504, the system 500 may have the panel assembly 532,534 secure the respective panel closed to restrict room ingress and egress via the panel opening, as shown in 610.

A processor of the system 500 may be configured to move the robot 526 to transfer the package(s) between the delivery vehicle 514 and the robot 526.

The processor 544 of the delivery vehicle 514 may be configured to operate a loading device 552 to transfer the package into or out of the delivery vehicle 514. A robot sensor may configured to sense robot location data associated with the location of the 552 relative to the delivery vehicle 514. The processor 544 of the delivery vehicle 514 and/or another processor of the system 500 may be configured to move the 552 into a location adjacent the delivery vehicle 514 to transfer the package(s) between the 552 and the delivery vehicle 514, based on the robot location data.

The robot sensor may be configured to sense robot location data associated with the location of the 552 relative to the delivery vehicle 514, package(s) P, panel assemblies 532,534, autonomous vehicle 516 and/or conveyor 528. The processor 544 of the delivery vehicle 514 and/or another processor of the system 500 may be configured to move the robot 526 and/or the autonomous vehicle 516 adjacent one another to transfer the package between the robot 526 and the autonomous vehicle 516, based on the robot location data and/or the vehicle location data.

Figure 31:
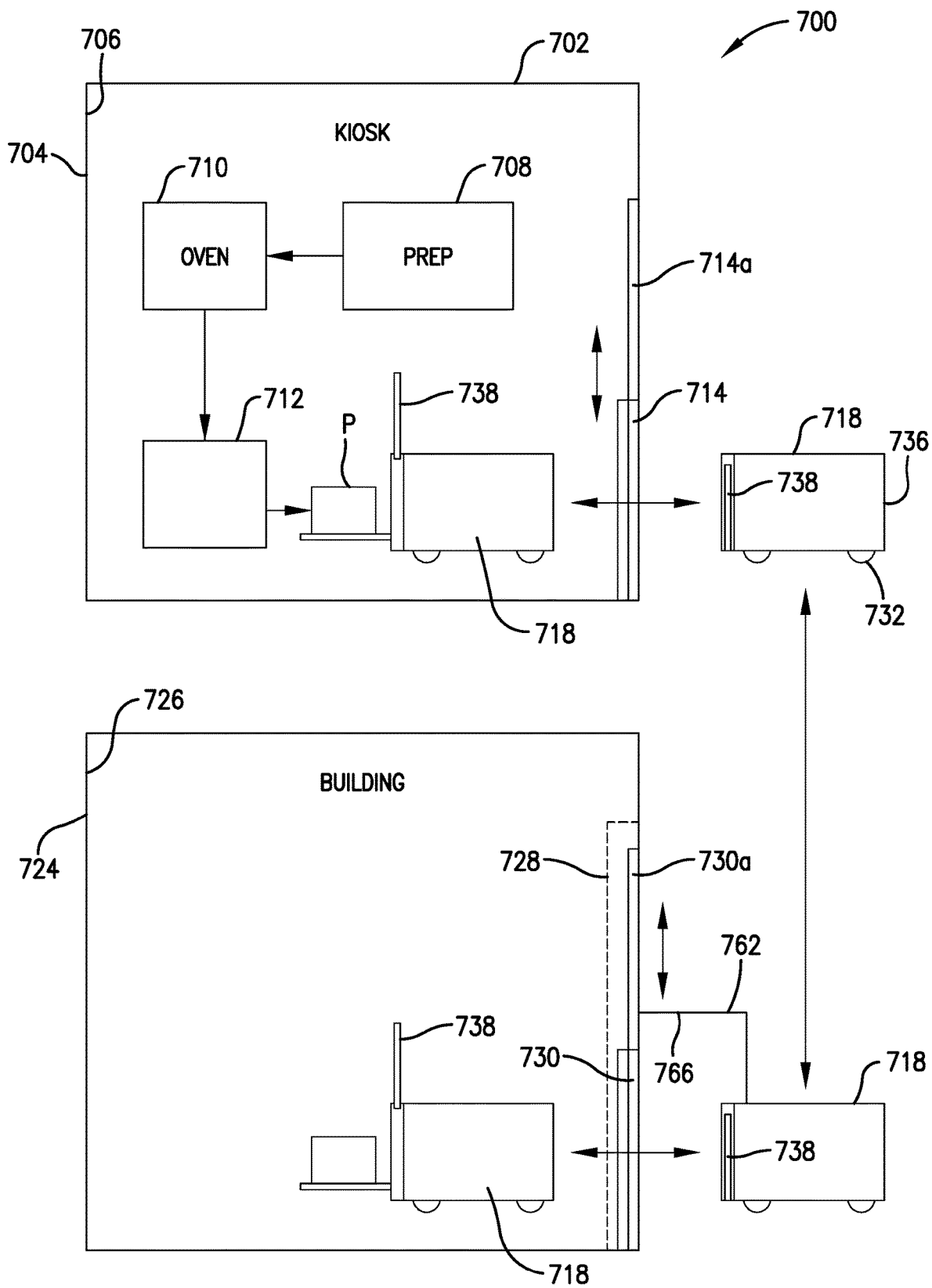
FIGS. 31-33 are schematic views of a shipping system constructed in accordance with a fifth embodiment of the present invention.
Figure 32:
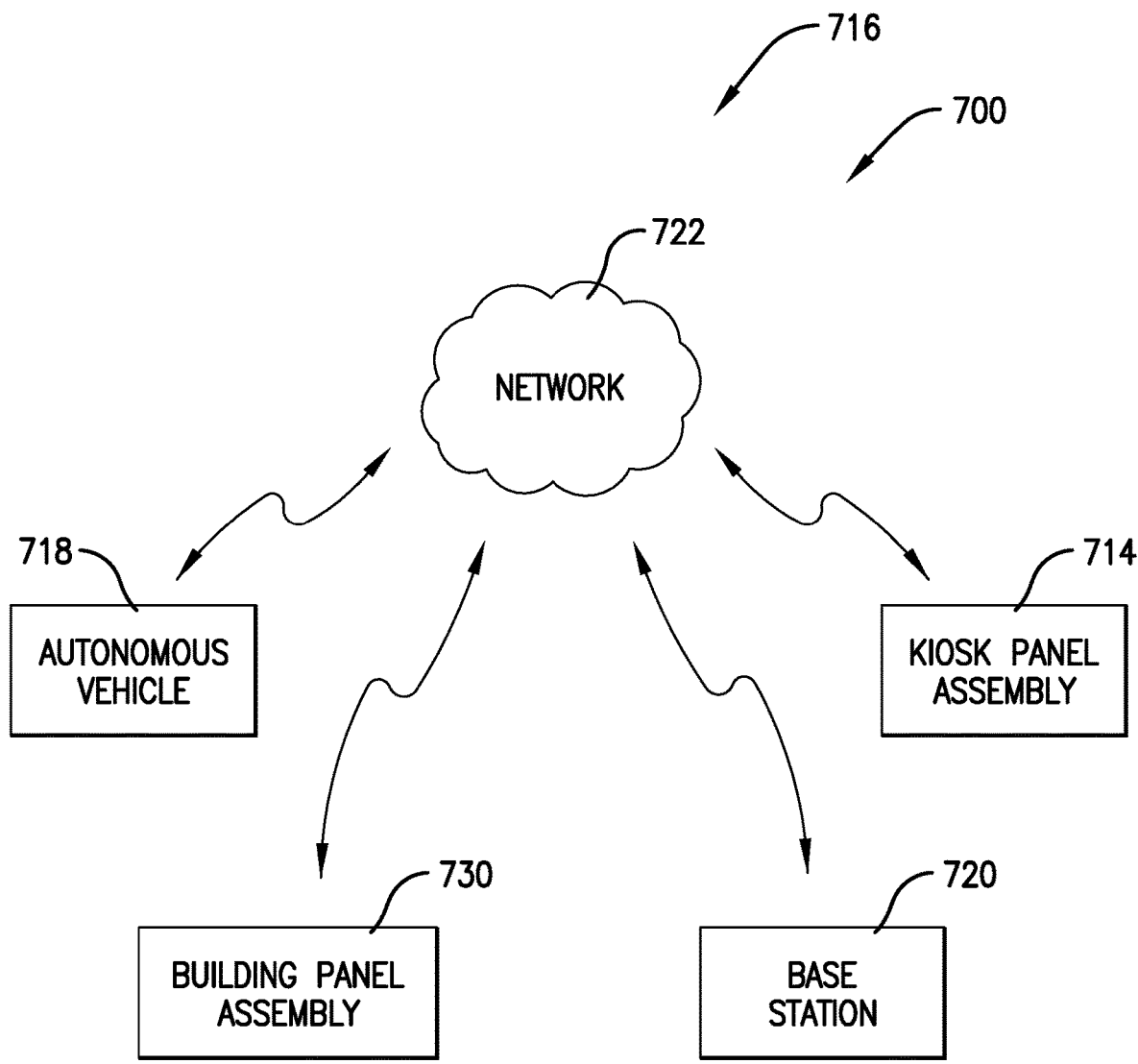
Figure 33:
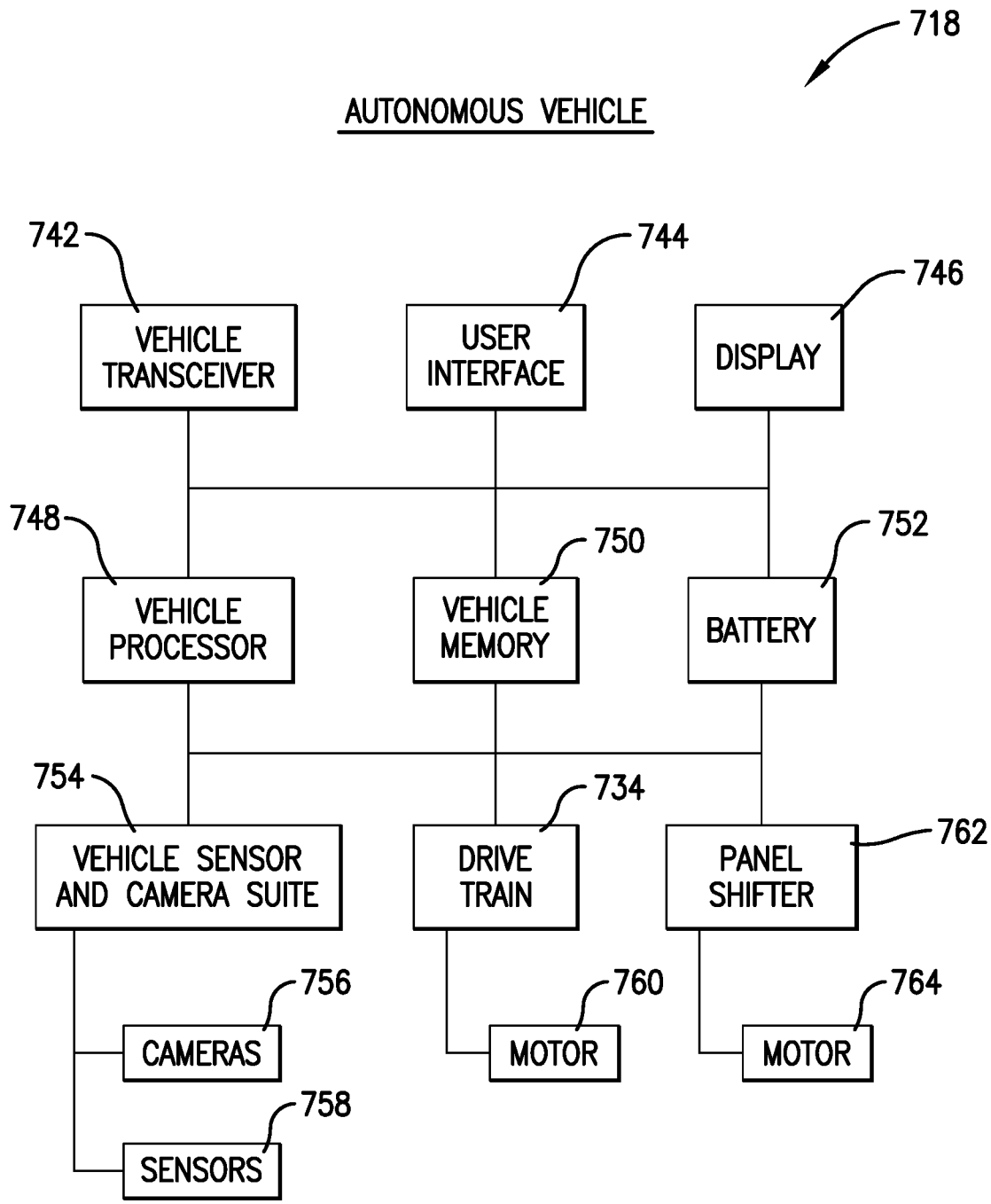

Turning to FIGS. 31-33, an alternative shipping system 700 is constructed in accordance with a fifth embodiment of the present invention. The following description of system 700 will primarily describe differences of the system 700 compared to the system 30.

The shipping system 700 is preferably used in association with a kiosk 702. The depicted kiosk 702 comprises a supply facility for supplying product to one or more customers and includes a secure building 704 with one or more secure spaces/rooms 706. In the illustrated embodiment, kiosk 702 may be configured to prepare and store food for subsequent purchase and delivery by customers. To that end, kiosk 702 preferably includes a food preparation area 708, oven 710, and food storage area 712 housed within the building 704.

It is also within the scope of certain aspects of the present invention for the embodiments of the kiosk to be used for preparation, manufacture, packaging, storage, and/or distribution of products other than food or other perishable items. In such embodiments, the kiosk may be configured to facilitate preparation, manufacture, packaging, storage, and/or distribution of nonperishable goods.

In preferred embodiments, equipment within the kiosk may be configured to conduct one or more automated tasks which may include, but are not limited to, preparation, manufacture, packaging, storage, and/or distribution of products. Such automated tasks may require some or no human intervention to complete the task. For at least certain embodiments, kiosk operations may be largely or entirely automated, such that no workers are required within the kiosk to complete one or more automated tasks. However, it will be appreciated that embodiments of the kiosk may be configured to accommodate one or more workers within one or more rooms of the kiosk.

For at least certain aspects of the present invention, a building structure other than a kiosk (e.g., a warehouse, office, residence, manufacturing facility, etc.) may be configured as a supply facility for supplying products to one or more customers. Alternative supply facilities may be used as an alternative to the kiosk or in addition to the kiosk. Accordingly, preferred embodiments may comprise a relatively larger supply facility, such as a post office, fulfillment warehouse, distribution hub, etc. for providing products to customers. To accommodate the use of multiple supply facilities, it will be appreciated that the system may operate one or more automated vehicles so that the vehicles are configured to travel for transporting package(s) between the facilities and/or transporting package(s) between one or more of the facilities and one or more customer locations.

In preferred embodiments, the building 704 of kiosk 702 may be unitary or may include multiple buildings to house various aspects of the facility, such as equipment and storage elements. The building 704 is preferably associated with a panel assembly 714 (which includes a shiftable panel 714*a*) that provides secure access to the room 706 from outside the kiosk 702 for package transfer and facilitates transportation of package(s) P into and/or out of the building 704.

The shipping system 700 includes a control system 716 for controlling package transfers associated with the building 704. The shipping system 700 also preferably includes one or more autonomous vehicles 718, a base station 720, and a network 722.

Shipping system 700 may also be used in association with one or more other buildings 724, which may be associated with one or more customers or other package recipients to receive one or more package deliveries. The depicted building 724 may comprise a secure building with one or more secure spaces/rooms 726. The building 724 is preferably associated with a building door 728 having a panel assembly 730 (similar to door 40) that provides secure access to the room 726 from outside the building 724 for package transfer and facilitates transportation of package(s) P into and/or out of the building 724. Panel assembly 730 preferably includes a shiftable panel 730*a*.

In preferred embodiments, the recipient building may comprise a residential home or apartment building. For at least certain aspects of the present invention, the recipient building may also include other types of enclosed building structures (e.g., a warehouse, office, residence, manufacturing facility, etc.) to receive a package shipment. It is also within the scope of at least certain aspects of the present invention for the recipient location to comprise a venue other than a building, such as an "open air" venue (e.g., a yard, dock, lot, field, driveway, pavilion, tent, terrace, etc.) that may or may not have a roof or other covering.

In the depicted embodiment, the autonomous vehicle 718 may include features of autonomous vehicles disclosed above and may also include features of delivery vehicles disclosed above.

The autonomous vehicle 718 is configured to receive and move a package P during the package transfer process. The autonomous vehicle 718 preferably includes a chassis 732, a drive train 734, and an enclosure 736 supported on the chassis 732.

The enclosure 736 preferably includes a powered enclosure door 738 that can be shifted vertically between open and closed positions (see FIG. 31) to provide selective access to an enclosure chamber. For instance, the door 738 may be opened for manual transfer of a package for receipt by the enclosure 736. However, the enclosure 736 may also be opened for automated transfer of a package to and/or from the enclosure 736 by another mechanism (such as an automated device of the kiosk).

The autonomous vehicle 718 is configured to carry and transport one or more package(s) P within the buildings 704,724. The autonomous vehicle 718 preferably provides elements of the control system 716, including a transceiver 742, user interface 744, display 746, processor 748, memory 750, battery 752, a sensor and camera suite 754 with cameras 756 and sensors 758, the drive train 734 with one or more motors 760, and a panel shifter 762 with one or more motors 764.

The illustrated panel shifter 762 preferably includes a vertically shiftable arm 766 that is powered by the motor 764. The depicted arm 766 is configured to removably and directly engage the panels 714*a*, 730*a* for shifting the panels 714*a*, 730*a* between open and/or closed positions. Physical engagement between the arm 766 and the panels 714*a*, 730*a* may be provided by various constructions within the scope of the present invention. For instance, the arm 766 and panel may include male and female connector elements that are complementally engaged with one another.

In other embodiments, the arm and panel may be removably frictionally engaged with one another. For instance, the arm may include a frictional engagement end provided by an elastomeric element. The element may be cup-shaped to produce a "suction" condition between the element and the panel to enhance frictional engagement therebetween.

The memory 750 may be an electronic memory that stores operation instructions and other relevant information for access and use by the processor 748.

The processor 748 may be an electronic processor executing one or more computer programs to control operation of the vehicle 718, including moving into a package transfer position relative to a person or device associated with the kiosk, moving into a package transfer position relative to a person or device associated with another building (such as the building 724) or a delivery vehicle, moving into a package transfer position relative to a delivery person, moving into the transfer position relative to another autonomous vehicle 718, transferring one or more packages between the transfer position and a position in the building 704 (e.g., a position on shelving or supported by another storage structure), and/or other autonomous movement/travel. The transceiver 742 may facilitate bi-directional communication between the vehicle 718 and the base station 720, a delivery vehicle, and/or a panel assembly (e.g., panel assembly 714,730) via the communications network 722, including receiving operation instructions for the vehicle 718.

The sensor and camera suite 754 may include one or more electronic cameras 756 and/or sensors 758 monitoring operations of the vehicle 718, panel assemblies 714,730, and/or other features of the system. The sensor and camera suite 754 may facilitate accomplishment of the functions of the vehicle 718, including moving into a transfer position relative to a building (such as building 704 or 724), a delivery vehicle 514, another autonomous vehicle 516, a delivery person, transferring one or more packages between the transfer position and a position in the facility 704,724 (e.g., a position on shelving), and/or other autonomous movement/travel. In particular, the vehicle 718 may include any internal and/or external sensors and/or cameras desired or needed to accomplish autonomous movement inside and/or outside of the buildings.

Sensors 758 may include a speed sensor configured to sense and generate speed data regarding a speed of movement of the vehicle 718 across a location; a weight sensor configured to sense and/or generate weight data regarding the weight(s) of the supported package(s), a motor and/or engine sensor configured to sense and generate motor performance, a navigation sensor configured to sense and generate navigation data regarding a geographic location of the vehicle 718, one or more cameras configured to provide images of the vehicle in operation, and/or an area around the vehicle, and/or a sensor (proximity sensor, optical sensor, accelerometer, etc.) associated with the panel shifter 762 to monitor position and movement of the panel shifter 762.

The processor 748 may accomplish moving and operating the vehicle 718 inside and/or outside the buildings in accordance with the set of operation instructions based at least in part on the speed, weight, motor, navigation, camera, and any other sensor and/or camera data.

The vehicle 718 may have external sensors and/or cameras to facilitate alignment and/or engagement with the panel assemblies 714,730 (such as alignment sensors to sense alignment markers on the delivery vehicle), a delivery vehicle, another autonomous vehicle, equipment located inside and/or outside the buildings, and/or package(s) P, and/or to facilitate coupling and uncoupling with the delivery vehicle, another autonomous vehicle, equipment located inside and/or outside the buildings, and/or package(s) P.

In particular, the vehicle 718 may have external sensors and/or cameras to facilitate the transfer of packages, such as alignment sensors to sense whether the vehicle 718 is properly aligned and engaged with the delivery vehicle, another autonomous vehicle, equipment located inside and/or outside the buildings, and/or package(s) P. The external sensors and/or camera suite 754 may sense or provide images of the vehicle 718, the delivery vehicle, another autonomous vehicle, equipment located inside and/or outside the buildings, and/or package(s) P to facilitate alignment, engagement, coupling and uncoupling, and/or identifying and transferring package(s).

The locations, contents, and statuses of packages may be provided in a look-up table or other data structure stored in a memory of the system 700, and the processor 748 may refer to such data to identify the location of package for transfer. Additionally or alternatively, a package identification indicia or data for each package may be indicated by a bar code or other machine readable label on an exterior package surface, and the vehicle 718 may sense and/or image the label to determine or confirm the identity of the package.

The vehicle 718 may have control and drive components, such as electrical, mechanical, and/or hydraulic controls for controlling operation of the vehicle 718 in accordance with operation instructions, and motors and/or engines for accomplishing the functions of the vehicle 718, including autonomous movement along or adjacent to the transfer location, aligning and/or engaging with package(s) P, panel assemblies 714,730, another autonomous vehicle, and/or a delivery vehicle, or coupling and uncoupling with package(s) P, panel assemblies 714,730, another autonomous vehicle, and/or a delivery vehicle, under the control of the processor 748 and the control components.

Vehicle location data associated with the location of the vehicle 718 (e.g., relative to package(s) P, panel assemblies 714,730, another autonomous vehicle, and/or a delivery vehicle) may be provided to the system 700.

The base station, panel assemblies 714,730, and/or autonomous vehicle 718 may include a sensor and/or camera used to collect vehicle location data, which may be sent to another part of the system 700 (e.g., by sending data to the base station). For example, the vehicle 718 may include a sensor (e.g., a navigation sensor configured to sense and generate navigation data regarding a geographic location and/or navigation camera) used to collect or generate the vehicle location data.

It will also be appreciated that vehicle location data may be collected by the system 700 as part of the process to initiate a package transfer.

Figure 34:
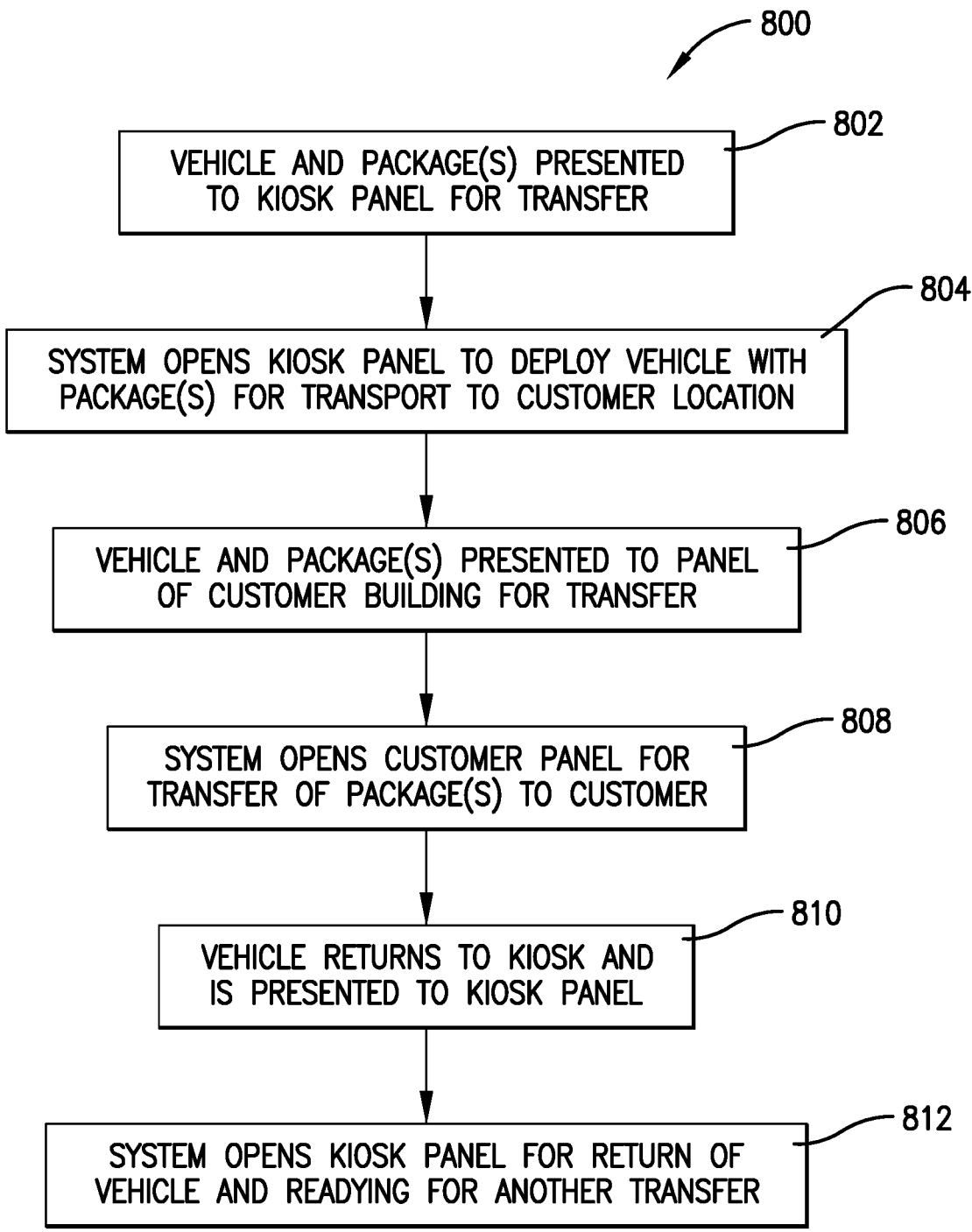
FIG. 34 is a schematic diagram of a control method of the shipping system shown in FIGS. 31-33.

Referring to FIG. 34, an embodiment of a control method 800 is shown for facilitating transfer of one or more packages relative to the kiosk and the building. It will be appreciated that the control methods described herein may be used in connection with a kiosk-supplying delivery process, where package(s) are delivered from a shipper (such as a supplier) at another location (not shown), via the automated vehicle 718 or another delivery vehicle, to a location or a person (i.e., a recipient) in a building (such as the kiosk), and/or a customer-supplying delivery process, where package(s) are delivered from a building (such as the kiosk) or a person in the building (i.e., a shipper), via the automated vehicle 718 or another delivery vehicle, to a recipient in the building or at another location. Furthermore, the described control methods may be used in connection with a delivery process where package(s) are delivered from a shipper in the kiosk or at another location to a recipient in the kiosk, the building, or another location.

The system 700 may be activated to initiate and conduct a package transfer. Initially, the vehicle 718 and package(s) may be presented to the panel assembly 714 of the kiosk 702 for transfer, as shown in 802. In one implementation, the vehicle or a person associated with delivery may provide package identification data to the system 700 (e.g., by sending data to the base station) as part of the process to initiate a package transfer. For instance, a person may manually input the data through a device or position a package adjacent the door so that a sensor (e.g., barcode scanner, RFID reader, etc.) and/or camera of the system 700 may collect sensor and/or camera data from the package.

The system 700 may then compare the package identifying data with a stored identifier to confirm that the package P corresponds with a shipment order. A processor of the system 700, such as the vehicle processor 748 or a processor of the panel assembly or the base station, is operable to receive package identification data associated with the package P.

In particular, a processor of the system 700 is configured to access a data structure containing an identifier for the package P. The identifier is generated in connection with creation of a shipment order. The system processor is configured to compare the identifier and the sensed package identification data to confirm a match, indicating the package corresponds with the shipment.

The system processor is also configured to open the panel 714*a* of the panel assembly 714, as shown in 804, to allow deployment of the vehicle 178 and package(s) relative to the kiosk 702 based upon confirmation that the identifier and package identification data match one another. The system processor is also configured to have the autonomous vehicle 718 moved based upon confirmation that the identifier and package identification data match one another.

In another implementation, a package deployment may be initiated when the system 700 senses the presence of the vehicle 718 and/or a person authorizing delivery adjacent the panel assembly 714. In another implementation, a package deployment may be initiated when the system 700 communicates with the vehicle 718 and/or a person authorizing delivery. In another implementation, a package deployment may be initiated when an occupant of the building B manually authorizes the system 700 to begin package deployment.

The panel assembly 714 may be configured within the scope of the present invention to be shiftable between open and closed positions without the use of an actuator. For instance, the panel assemblies may be shiftable via the vehicle 718. In various embodiments, the vehicle 718 may have the panel shifter 752 engage the corresponding panel 714*a* and to raise and/or lower the panel 714*a*.

Subsequent to deployment, the vehicle 718 and package(s) may be presented to the panel assembly 730 of the building 724 for package transfer, as shown in 806. In one implementation, the vehicle or a person associated with delivery may provide package identification data to the system 700 (e.g., by sending data to the base station) as part of the process to initiate a package transfer. For instance, a person may manually input the data through a device or position a package adjacent the door so that a sensor (e.g., barcode scanner, RFID reader, etc.) and/or camera of the system 700 may collect sensor and/or camera data from the package.

The system 700 may then compare the package identifying data with a stored identifier to confirm that the package P corresponds with a shipment order. A processor of the system 700, such as the vehicle processor 748 or a processor of the panel assembly or the base station, is operable to receive package identification data associated with the package P.

Again, a processor of the system 700 is configured to access a data structure containing an identifier for the package P. The identifier is generated in connection with creation of a shipment order. The system processor is configured to compare the identifier and the sensed package identification data to confirm a match, indicating the package corresponds with the shipment.

The system processor is also configured to open the panel 730*a* of the panel assembly 730, as shown in 808, to allow transfer of the package(s) relative to the building 724 based upon confirmation that the identifier and package identification data match one another. The system processor is also configured to have the autonomous vehicle 718 moved based upon confirmation that the identifier and package identification data match one another.

In another implementation, a package transfer may be initiated when the system 700 senses the presence of the vehicle 718 and/or a person authorizing delivery adjacent the panel assembly 714. In another implementation, a package deployment may be initiated when the system 700 communicates with the vehicle 718 and/or a person authorizing delivery. In another implementation, a package transfer may be initiated when an occupant of the building B manually authorizes the system 700 to begin package transfer.

The panel assembly 730 may be configured within the scope of the present invention to be shiftable between open and closed positions without the use of an actuator. For instance, the panel assembly may be shiftable via the vehicle 718. In various embodiments, the vehicle 718 may have the panel shifter 752 engage the corresponding panel 730*a* and to raise and/or lower the panel 730*a*.

In one implementation, with the autonomous vehicle 718 in the ready position and the panel 730*a* opened, the autonomous vehicle 718 may be configured to have a package removed therefrom.

In another implementation, with the autonomous vehicle 718 in the ready position and the panel 730*a* opened, the autonomous vehicle 36 may be configured to be advanced through the panel opening for room ingress to have the package removed.

Again, operation instructions may include whether a transfer location for the autonomous vehicle is outside the building B or within the room. For instance, the transfer location may be outside the building B (e.g., on a porch, walkway, driveway, street, etc. adjacent the building) for receiving the package from a delivery service or providing a package for pickup by the delivery service.

Subsequent to package transfer and with the vehicle 718 located outside the building B, the system 700 may have the panel 730*a* remain open. However, for at least some embodiments of the present invention, the system 700 may have the panel 730*a* return to the closed position.

Subsequent to confirmation of package transfer, the system 700 has the autonomous vehicle 718 returned to the kiosk, as shown in 810. The vehicle 718 is returned to the kiosk and presented to the panel 714*a* of the kiosk.

In one implementation, the vehicle 718 or a person associated with delivery may provide vehicle identification data to the system 700 (e.g., by sending data to the base station) as part of the process to return the vehicle 718 to the kiosk. For instance, the vehicle 718 may transmit vehicle identification data to the system 700 when in close proximity to the panel 714*a* to initiate opening of the panel 714*a*. Alternatively, a person may manually input data through a device to authorize return of the vehicle and initiate opening of the panel 714*a*.

The system 700 may then compare the vehicle identifying data with a stored identifier to confirm that the vehicle 718 is authorized to gain access to the kiosk. A processor of the system 700, such as the vehicle processor 748 or a processor of the panel assembly or the base station, is operable to receive vehicle identification data associated with the vehicle 718.

A processor of the system 700 is configured to access a data structure containing an identifier for the vehicle 718. The identifier is generated in connection with creation of a shipment order. The system processor is configured to compare the identifier and the sensed vehicle identification data to confirm a match, indicating the vehicle corresponds with the shipment.

The system processor is also configured to open the panel 714a of the panel assembly 714, as shown in 812, to allow ingress of the vehicle 718 relative to the kiosk based upon confirmation that the identifier and vehicle identification data match one another. The system processor is also configured to have the autonomous vehicle 718 moved based upon confirmation that the identifier and vehicle identification data match one another.

In another implementation, vehicle ingress relative to the kiosk may be initiated when the system 700 senses the presence of the vehicle 718 and/or a person authorizing vehicle return adjacent the panel assembly 714. In another implementation, a vehicle ingress relative to the kiosk may be initiated when the system 700 communicates with the vehicle 718 and/or a person authorizing the return (such as a person inside or outside the kiosk).

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

The invention claimed is:

1. A shipping system configured to facilitate transfer of a package into and/or out of a room in a building, said shipping system for controlling a shiftable panel of the building to selectively provide a path into and out of the room, said shipping system comprising:
    an autonomous vehicle configured to be advanced along the path to facilitate package transfer; and
    a control system configured to permit movement of the package into and/or out of the room,
    said control system configured to control the shiftable panel to selectively provide the path into and out of the room,
    said control system including:
    a vehicle sensor configured to sense vehicle location data associated with the location of the autonomous vehicle relative to the panel, and a system processor configured to
    receive package identification data associated with the package,
    have the panel opened to allow room ingress and egress along the path based on the package identification data,
    move the autonomous vehicle to a location adjacent the panel to facilitate package transfer, based on the vehicle location data, and
    have the panel closed to restrict room ingress and egress along the path in response to a determination that the package has been transferred into or out of the room via the path.

2. The shipping system as claimed in claim 1,
    said autonomous vehicle including a shiftable element configured to drive the panel open and/or closed.

3. The shipping system as claimed in claim 2,
    said shiftable element configured to directly engage and shift the panel open and/or closed.

4. The shipping system as claimed in claim 1, further comprising:
    a package identifying sensor configured to sense the package identification data.

5. The shipping system as claimed in claim 4,
    said system processor configured to access a data structure containing an identifier for the package, with the identifier being generated in connection with creation of the shipment order, and based thereon, comparing the identifier and package identification data to confirm a match therebetween, such that the package corresponds with the shipment.

6. The shipping system as claimed in claim 4,
    said system processor configured to open the panel to allow room ingress and egress based upon confirmation that the identifier and package identification data match one another.

7. The shipping system as claimed in claim 4,
    said system processor configured to have the autonomous vehicle moved based upon confirmation that the identifier and package identification data match one another.

8. The shipping system as claimed in claim 1, further comprising:
    a location sensor configured to sense package location data associated with the location of the package relative to the panel,
    said location sensor being configured to directly sense the package location corresponding to the package location data, said location sensor including at least one of a barcode scanner, RFID reader, and camera.

9. The shipping system as claimed in claim 1, further comprising:
    a package transfer sensor configured to sense package transfer data associated with the package being received by the vehicle or removed relative to the vehicle,
    said system processor configured to position the autonomous vehicle inside or outside the room for package transfer,
    said system processor configured to have the autonomous vehicle moved to advance the package into or out of the room, based on package transfer data from the package transfer sensor.

10. The shipping system as claimed in claim 1, further comprising:
a delivery transceiver associated with a delivery vehicle and configured to send package identification data associated with the package; and
a system transceiver configured to receive package identification data associated with the package from the delivery transceiver.

11. The shipping system as claimed in claim 1, further comprising:
a delivery processor configured to operate a loading device to transfer the package into or out of a delivery vehicle,
said system processor and/or said delivery processor configured to have the autonomous vehicle moved into a location adjacent the delivery vehicle to transfer the package between the autonomous vehicle and the delivery vehicle, based on the vehicle location data.

12. A shipping system configured to facilitate transfer of a package into and/or out of a room in a building, said shipping system being operable to selectively provide a path into and out of the room for package transfer and an autonomous vehicle configured to be advanced along the path to facilitate package transfer, said shipping system comprising:
a shiftable panel assembly operable to be constructed as part of the building and including a shiftable panel that is shiftable between open and closed positions to selectively provide access to the room; and
a control system configured to permit movement of the package into and/or out of the room,
said control system configured to control the shiftable panel to selectively provide the path into and out of the room,
said control system including:
a location sensor configured to sense package location data associated with the location of the package relative to the panel; and
a system processor configured to
receive package identification data associated with the package,
have the panel opened to allow room ingress and egress along the path based on the package identification data,
move the autonomous vehicle to a location adjacent the panel to facilitate package transfer, based on the vehicle location data, and
have the panel closed to restrict room ingress and egress along the path in response to a determination that the package has been transferred into or out of the room via the path.

13. The shipping system as claimed in claim 12, further comprising:
a package identifying sensor configured to sense the package identification data.

14. The shipping system as claimed in claim 13,
said system processor configured to access a data structure containing an identifier for the package, with the identifier being generated in connection with creation of the shipment order, and based thereon, comparing the identifier and package identification data to confirm a match therebetween, such that the package corresponds with the shipment.

15. The shipping system as claimed in claim 14,
said system processor configured to open the panel to allow room ingress and egress based upon confirmation that the identifier and package identification data match one another.

16. The shipping system as claimed in claim 14,
said system processor configured to move the autonomous vehicle based upon confirmation that the identifier and package identification data match one another.

17. The shipping system as claimed in claim 13,
said package identifying sensor including at least one of a barcode scanner, RFID reader, and camera.

18. The shipping system as claimed in claim 12,
said location sensor being configured to directly sense the package location corresponding to the package location data, said location sensor including at least one of a barcode scanner, RFID reader, and camera.

19. The shipping system as claimed in claim 12, further comprising:
an autonomous vehicle configured to be advanced along the path to receive the package; and a vehicle sensor configured to sense vehicle location data associated with the location of the autonomous vehicle relative to the panel,
said system processor being configured to move the autonomous vehicle to a location adjacent the panel to receive the package, based on the vehicle location data.

20. The shipping system as claimed in claim 12, further comprising:
a package transfer sensor configured to sense package transfer data associated with the package being received by the vehicle or removed relative to the vehicle,
said system processor configured to position the autonomous vehicle inside or outside the room for package transfer,
said system processor configured to have the autonomous vehicle moved to advance the package into or out of the room, based on package transfer data from the package transfer sensor.

21. The shipping system as claimed in claim 12, further comprising:
a delivery transceiver associated with the delivery vehicle and configured to send package identification data associated with the package; and
a system transceiver configured to receive package identification data associated with the package from the delivery transceiver.

22. The shipping system as claimed in claim 12, further comprising:
a delivery processor configured to operate a loading device to transfer the package into or out of the delivery vehicle,
said system processor and/or said delivery processor configured to move the autonomous vehicle into a location adjacent the delivery vehicle to transfer the package between the autonomous vehicle and the delivery vehicle, based on the vehicle location data.

\* \* \* \* \*